(12) United States Patent
Agrafiotis et al.

(10) Patent No.: US 7,139,739 B2
(45) Date of Patent: Nov. 21, 2006

(54) METHOD, SYSTEM, AND COMPUTER PROGRAM PRODUCT FOR REPRESENTING OBJECT RELATIONSHIPS IN A MULTIDIMENSIONAL SPACE

(75) Inventors: Dimitris K Agrafiotis, Downington, PA (US); Dmitrii N Rassokhin, Exton, PA (US); Victor S Lobanov, North Brunswick, NJ (US); Francis R Salemme, Yardley, PA (US)

(73) Assignee: Johnson & Johnson Pharmaceutical Research & Development, L.L.C., Raritan, NJ (US)

( * ) Notice: Subject to any disclaimer, the term of this patent is extended or adjusted under 35 U.S.C. 154(b) by 868 days.

(21) Appl. No.: 09/823,977

(22) Filed: Apr. 3, 2001

(65) Prior Publication Data

US 2002/0099675 A1 Jul. 25, 2002

Related U.S. Application Data

(60) Provisional application No. 60/194,307, filed on Apr. 3, 2000.

(51) Int. Cl.
G06N 5/00 (2006.01)
(52) U.S. Cl. .............................. 706/20; 706/45; 382/157
(58) Field of Classification Search .................. 706/20, 706/25, 16, 45, 15; 382/157, 224
See application file for complete search history.

(56) References Cited

U.S. PATENT DOCUMENTS

| | | | |
|---|---|---|---|
| 4,773,099 A | 9/1988 | Bokser | |
| 4,811,217 A | 3/1989 | Tokizane et al. | |
| 4,859,736 A | 8/1989 | Rink | |
| 4,908,773 A | 3/1990 | Pantoliano et al. | |
| 4,935,875 A | 6/1990 | Shah et al. | |
| 4,939,666 A | 7/1990 | Hardman | |
| 5,010,175 A | 4/1991 | Rutter et al. | |
| 5,025,388 A | 6/1991 | Cramer, III et al. | |
| 5,095,443 A | 3/1992 | Watanabe | |
| 5,155,801 A | 10/1992 | Lincoln | |
| 5,167,009 A | 11/1992 | Skeirik | |
| 5,181,259 A | 1/1993 | Rorvig | |
| 5,240,680 A | 8/1993 | Zuckermann et al. | |
| 5,260,882 A | 11/1993 | Blanco et al. | |

(Continued)

FOREIGN PATENT DOCUMENTS

EP 0 355 266 B1 2/1990

(Continued)

OTHER PUBLICATIONS

Arslan, The BP Neural Networks With Data Clustering Enhancement—An Emerging Optimization Tool, Proceedings of the 1996 IEEE International Symposium on Intelligent Control, Dearborn, MI, Sep. 15-18, 1996, pp. 188-193.*

(Continued)

*Primary Examiner*—Wilbert L. Starks, Jr.

(57) ABSTRACT

A method, system, and computer product is presented for mapping a set of patterns into an m-dimensional space so as to preserve relationships that may exist between these patterns. A subset of the input patterns is chosen and mapped into the m-dimensional space using an iterative nonlinear mapping process based on subset refinements. A set of n attributes are determined for each pattern, and one or more neural networks or other supervised machine learning techniques are then trained in accordance with the mapping produced by the iterative process. Additional input patterns not in the subset are mapped into the m-dimensional space by determining their n input attributes and using the neural networks in a feed-forward (prediction) mode.

27 Claims, 12 Drawing Sheets

U.S. PATENT DOCUMENTS

| | | | |
|---|---|---|---|
| 5,265,030 A | 11/1993 | Skolnick et al. | |
| 5,270,170 A | 12/1993 | Schatz et al. | |
| 5,274,714 A * | 12/1993 | Hutcheson et al. | 382/157 |
| 5,288,514 A | 2/1994 | Ellman | |
| 5,307,287 A | 4/1994 | Cramer, III et al. | |
| 5,323,471 A | 6/1994 | Hayashi | |
| 5,331,573 A | 7/1994 | Balaji et al. | |
| 5,434,796 A | 7/1995 | Weininger | |
| 5,436,850 A | 7/1995 | Eisenberg et al. | |
| 5,442,122 A | 8/1995 | Noda et al. | |
| 5,463,564 A | 10/1995 | Agrafiotis et al. | |
| 5,499,193 A | 3/1996 | Sugawara et al. | |
| 5,519,635 A | 5/1996 | Miyake et al. | |
| 5,524,065 A | 6/1996 | Yagasaki | |
| 5,526,281 A | 6/1996 | Chapman et al. | |
| 5,545,568 A | 8/1996 | Ellman | |
| 5,549,974 A | 8/1996 | Holmes | |
| 5,553,225 A | 9/1996 | Perry | |
| 5,559,929 A * | 9/1996 | Wasserman | 706/25 |
| 5,574,656 A | 11/1996 | Agrafiotis et al. | |
| 5,585,277 A | 12/1996 | Bowie et al. | |
| 5,598,510 A | 1/1997 | Castelaz | |
| 5,602,755 A | 2/1997 | Ashe et al. | |
| 5,602,938 A | 2/1997 | Akiyama et al. | |
| 5,612,895 A | 3/1997 | Balaji et al. | |
| 5,621,861 A | 4/1997 | Hayashi et al. | |
| 5,634,017 A | 5/1997 | Mohanty et al. | |
| 5,635,598 A | 6/1997 | Lebl et al. | |
| 5,670,326 A | 9/1997 | Beutel | |
| 5,679,582 A | 10/1997 | Bowie et al. | |
| 5,684,711 A | 11/1997 | Agrafiotis et al. | |
| 5,703,792 A | 12/1997 | Chapman | |
| 5,712,171 A | 1/1998 | Zambias et al. | |
| 5,712,564 A | 1/1998 | Hayosh | |
| 5,729,662 A * | 3/1998 | Rozmus | 706/20 |
| 5,734,796 A | 3/1998 | Pao | |
| 5,736,412 A | 4/1998 | Zambias et al. | |
| 5,740,326 A | 4/1998 | Boulet et al. | |
| 5,789,160 A | 8/1998 | Eaton et al. | |
| 5,807,754 A | 9/1998 | Zambias et al. | |
| 5,809,490 A * | 9/1998 | Guiver et al. | 706/16 |
| 5,811,241 A | 9/1998 | Goodfellow et al. | |
| 5,822,741 A * | 10/1998 | Fischthal | 706/16 |
| 5,832,494 A | 11/1998 | Egger et al. | |
| 5,858,660 A | 1/1999 | Eaton et al. | |
| 5,861,532 A | 1/1999 | Brown et al. | |
| 5,866,334 A | 2/1999 | Beutel | |
| 5,901,069 A | 5/1999 | Agrafiotis et al. | |
| 5,908,960 A | 6/1999 | Newlander | |
| 5,933,819 A | 8/1999 | Skolnick et al. | |
| 6,014,661 A | 1/2000 | Ahlberg et al. | |
| 6,026,397 A | 2/2000 | Sheppard | |
| 6,037,135 A | 3/2000 | Kubo et al. | |
| 6,049,797 A | 4/2000 | Guha et al. | |
| 6,185,506 B1 | 2/2001 | Cramer et al. | |
| 6,226,408 B1 * | 5/2001 | Sirosh | 382/224 |
| 6,240,374 B1 | 5/2001 | Cramer et al. | |
| 6,295,514 B1 | 9/2001 | Agrafiotis et al. | |

FOREIGN PATENT DOCUMENTS

| | | |
|---|---|---|
| EP | 0 355 628 B1 | 2/1990 |
| EP | 0 770 876 A1 | 5/1997 |
| EP | 0 818 744 A2 | 1/1998 |
| WO | WO 91/19735 | 12/1991 |
| WO | WO 92/00091 | 1/1992 |
| WO | WO 93/20242 | 10/1993 |
| WO | WO 94/28504 | 12/1994 |
| WO | WO 95/01606 | 1/1995 |
| WO | WO 97/09342 | 3/1997 |
| WO | WO 97/20952 | 6/1997 |
| WO | WO 97/27559 | 7/1997 |
| WO | WO 98/20437 | 5/1998 |
| WO | WO 98/20459 | 5/1998 |

OTHER PUBLICATIONS

Borg, Ingwer and Groenen, Patrick, *Modern Multidimensional Scaling Theory and Applications*, Springer Series in Statistics, 1997, entire book submitted.

Agrafiotis, D.K. et al., "Advances in diversity profiling and combinatorial series design," *Molecular Diversity*, Kluwer Academic Publishers, vol. 4, 1999, pp. 1-22.

Agrafiotis, D.K. and Lobanov, V.S., "An Efficient Implementation of Distance-Based Diversity Measures Based on k-d Trees," *Journal of Chemical Information and Computer Science*, American Chemical Society, vol. 39, No. 1, Nov. 17, 1999 (Published on Web), pp. 51-58.

Agrafiotis, D.K. and Lobanov, V.S., "Bridging The Gap Between Diversity And QSAR," *Abstracts of Papers Part 1: 215th ACS National Meeting*, American Chemical Society, Mar. 29-Apr. 2, 1998, p. 181-COMP.

Agrafiotis, D.K. and Jaeger, E.P., "Directed Diversity®: An Operating System For Combinatorial Chemistry," *Abstracts of Papers Part 1: 211th ACS National Meeting*, American Chemical Society, Mar. 24-28, 1996, p. 46-COMP.

Agrafiotis, D.K., "Diversity of Chemical Libraries," *Encyclopedia of Computational Chemistry*, John Wiley & Sons Ltd, vol. 1:A-D, 1998, pp. 742-761.

Agrafiotis, D.K., "On the Use of Information Theory for Assessing Molecular Diversity," *Journal of Chemical Information and Computer Science*, American Chemical Society, vol. 37, No. 3, May/Jun. 1997, pp. 576-580.

Agrafiotis, D.K. et al., "Parallel QSAR," *Abstracts of Papers Part 1: 217th ACS National Meeting*, Mar. 21-25, 1999, p. 50-COMP.

Agrafiotis, D.K. et al., "PRODEN: A New Program for Calculating Integrated Projected Populations," *Journal of Computational Chemistry*, John Wiley & Sons, Inc., vol. 11, No. 9, Oct. 1990, pp. 1101-1110.

Agrafiotis, D.K. and Jaeger, E.P., "Stochastic Algorithms for Exploring Molecular Diversity," *Abstracts of Papers Part 1: 213th ACS National Meeting*, American Chemical Society, Apr. 13-17, 1997, p. 16-CINF.

Agrafiotis, D., "Theoretical Aspects of the Complex: Arts and New Technologies," *Applications and Impacts Information Processing '94*, North-Holland, vol. II, 1994, pp. 714-719.

Biswas, G. et al., "Evaluation of Projection Algorithms," *IEEE Transactions On Pattern Analysis And Machine Intelligence*, IEEE Computer Society, vol. PAMI-3, No. 6, Nov. 1981, pp. 701-708.

Bonchev, D. and Trinajstić, N., "Information theory, distance matrix, and molecular branching," *The Journal of Chemical Physics*, American Institute of Physics, vol. 67, No. 10, Nov. 15, 1977, pp. 4517-4533.

Chang, C.L. and Lee, R.C.T., "A Heuristic Relaxation Method for Nonlinear Mapping in Cluster Analysis," *IEEE Transactions on Systems, Man, and Cybernetics*, IEEE Systems, Man, and Cybernetics Society, vol. SMC-3, Mar. 1973, pp. 197-200.

Cramer, R.D. et al., "Virtual Compound Libraries: A New Approach to Decision Making in Molecular Discovery Research," *J. Chem. Inf. Comput. Sci.*, American Chemical Society, vol. 38, No. 6, Nov./Dec. 1998, pp. 1010-1023.

DeMers, D. and Cottrell, G., "Non-Linear Dimensionality Reduction," *Advances in Neural Information Processing Systems*, vol. 5, 1993, pp. 580-587.

Frey, P.W. and Slate, D.J., "Letter Recognition Using Holland-Style Adaptive Classifiers," *Machine Learning*, Kluwer Academic Publishers, vol. 6, 1991, pp. 161-182.

Friedman, J.H., "Exploratory Projection Pursuit," *Journal of the American Statistical Association*, American Statistical Association, vol. 82, No. 397, Mar. 1987, pp. 249-266.

Friedman, J.H. and Tukey, J.W., "A Projection Pursuit Algorithm for Exploratory Data Analysis," *IEEE Transactions on Computers*, IEEE Computer Society, vol. C-23, No. 9, Sep. 1974, pp. 881-889.

Garrido, L. et al., "Use of Multilayer Feedforward Neural Nets As A Display Method for Multidimensional Distributions," *International Journal of Neural Systems*, World Scientific Publishing Co. Pte. Ltd., vol. 6, No. 3, Sep. 1995, pp. 273-282.

Ghose, A.K. et al., "Prediction of Hydrophobic (Lipophilic) Properties of Small Organic Molecules Using Fragmental Methods: An Analysis of ALOGP and CLOGP Methods," *Journal of Physical Chemistry*, American Chemical Society, vol. 102, No. 21, May 21, 1998, pp. 3762-3772.

Hall, L.H. and Kier, L.B., "The Molecular Connectivity Chi Indexes and Kappa Shape Indexes in Structure-Property Modeling," *Reviews in Computational Chemistry: Advances*, VCH Publishers, Inc., 1991, pp. 367-422.

Hecht-Nielsen, R., "Replicator Neural Networks for Universal Optimal Source Coding," *Science*, American Association for the Advancement of Science, vol. 269, Sep. 29, 1995, pp. 1860-1863.

Hotelling, H., "Analysis of a Complex of Statistical Variables into Principal Components," *The Journal of Educational Psychology*, Warwick and York, Inc., vol. XXIV, No. 6, Sep. 1933, pp. 417-441.

Hotelling, H., "Analysis of a Complex of Statistical Variables into Principal Components," *The Journal of Educational Psychology*, Warwick and York, Inc., vol. XXIV, No. 7, Oct. 1933, pp. 498-520.

Lee, R.C.T. et al., "A Triangulation Method for the Sequential Mapping of Points from N-Space to Two-Space," *IEEE Transactions on Computers*, The Insitute of Electrical and Electronics Engineers, Mar. 1977, pp. 288-292.

Lipinski, C.A. et al., "Experimental and computational approaches to estimate solubility and permeability in drug discovery and development settings, " *Advanced Drug Delivery Reviews*, Elsevier Science B.V., vol. 23, 1997, pp. 3-25.

Lobanov, V.S. and Agrafiotis, D.K., "Intelligent Database Mining Techniques," *Abstracts of Papers Part 1: 215th ACS National Meeting*, Mar. 29-Apr. 2, 1998, p. 19-COMP.

Lobanov, V.S. et al., "Rational Selections from Virtual Libraries," *Abstracts of Papers Part 1: 217th ACS National Meeting*, Mar. 21-25, 1999, p. 181-COMP.

Mao, J. and Jain, A.K., "Artificial Neural Networks for Feature Extraction and Multivariate Data Projection," *IEEE transactions on Neural Networks*, IEEE Neural Networks Council, vol. 6, No. 2, Mar. 1995, pp. 296-317.

Oja, E., "Principal Components, Minor Components, and Linear Neural Networks," *Neural Networks*, Pergamon Press Ltd., vol. 5, 1992, pp. 927-935.

Patterson, D.E. et al., "Neighborhood Behavior: A Useful Concept for Validation of 'Molecular Diversity' Descriptors," *Journal of Medicinal Chemistry*, American Chemical Society, vol. 39, No. 16, 1996, pp. 3049-3059.

Pykett, C.E., "Improving the Efficiency of Sammon's Nonlinear Mapping by Using Clustering Archetypes," *Electronics Letters*, The Institution of Electrical Engineers, vol. 14, No. 25, Dec. 7, 1978, pp. 799-800.

Rubner, J. and Tavan, P., "A Self-Organizing Network for Principal-Component Analysis," *Europhysics Letters*, European Physical Society, vol. 10, No. 7, Dec. 1, 1989, pp. 693-698.

Sadowski, J. et al., "Assessing Similarity and Diversity of Combinatorial Libraries by Spatial Autocorrelation Functions and Neural Networks," *Angewandte Chemie*, VCH, vol. 34, No. 23/24, Jan. 5, 1996, pp. 2674-2677.

Thompson, L.A. and Ellman, J.A., "Synthesis and Applications of Small Molecule Libraries," *Chemical Reviews*, American Chemical Society, vol. 96, No. 1, Jan./Feb. 1996, pp. 555-585, 588-600.

Barnard, John M. and Downs, Geoff M., "Computer representation and manipulation of combinatorial libraries," *Perspectives in Drug Discovery and Design*, Kluwer Academic Publishers, 1997, pp. 13-30.

Brint, Andrew T. and Willett, Peter, "Upperbound procedures for the identification of similar three-dimensional chemical structures," *Journal of Computer-Aided Molecular Design*, ESCOM Science Publishers B.V., vol. 2, No. 4, Jan. 1989, pp. 311-320.

Brown, Robert D. and Martin, Yvonne C., "Designing Combinatorial Library Mixtures Using a Genetic Algorithm," *Journal of Medicinal Chemistry*, American Chemical Society, vol. 40, No. 15, 1997, pp. 2304-2313.

Gillet, Valerie J. et al., "The Effectiveness of Reactant Pools for Generating Structurally-Diverse Combinatorial Libraries," *Journal of Chemical and Information Computer Sciences*, American Chemical Society, vol. 37, No. 4, 1997, pp. 731-740.

Gillet, Valerie J. et al., "Selecting Combinatorial Libraries to Optimize Diversity and Physical Properties, " *Journal of Chemical Information and Computer Sciences*, American Chemical Society, vol. 39, No. 1, Dec. 17, 1998 (Published on Web), pp. 169-177.

Kearsley, Simon K. et al., "Chemical Similarity Using Physiochemical Property Descriptors," *Journal of Chemical Information and Computer Sciences*, American Chemical Society, vol. 36, No. 1, 1996, pp. 118-127.

Leland, Burton A. et al., "Managing the Combinatorial Explosion," *Journal of Chemical Information and Computer Science*, American Chemical Society, vol. 37, No. 1, 1997, pp. 62-70.

Lewis, Richard A. et al., "Similarity Measures for Rational Set Selection and Analysis of Combinatorial Libraries: The Diverse Property-Derived (DPD) Approach," *Journal of Chemical Information and Computer Sciences*, American Chemical Society, vol. 37, No. 3, 1997, pp. 599-614.

Martin, Eric J. and Critchlow, Roger E., "Beyond Mere Diversity: Tailoring Combinatorial Libraries for Drug Discovery," *Journal of Combinatorial Chemistry*, American Chemical Society, vol. 1, No. 1, Dec. 18, 1998 (Published on Web), pp. 32-45.

Sheridan, Robert P. et al., "Chemical Similarity Using Geometric Atom Pair Descriptors," *Journal of Chemical Information and Computer Sciences*, American Chemical Society, vol. 36, No. 1, 1996, pp. 128-136.

Willett, Peter et al., "Chemical Similarity Searching," *Journal of Chemical Information and Computer Sciences*, American Chemical Society, vol. 38, No. 6, Jul. 21, 1998 (Published on Web), pp. 983-996.

Agrafiotis, Dimitris K. and Lobanov, Victor S., "Ultrafast Algorithm for Designing Focused Combinational Arrays," *Journal of Chemical Information and Computer Sciences*, American Chemical Society, 2000, vol. 40, No. 4, pp. 1030-1038.

Ajay et al., "Can We Learn To Distinguish between 'Drug-like' Molecules?" *Journal of Medicinal Chemistry*, Jul. 23, 1998 (Published on Web), American Chemical Society, vol. 41, No. 18, pp. 3314-3324.

English-language Abstract of European Patent No. 0 355 628, printed from Dialog File No. 351(Feb. 1990—Date of publication of application), 2 pages.

Brown, Robert D. and Martin, Yvonne C., "The Information Content of 2D and 3D Structural Descriptors Relevant to Ligand-Receptor Binding," *Journal of Chemical Information and Computer Sciences*, American Chemical Society, 1977, vol. 37, No. 1, pp. 1-9.

Brown, Robert D. and Martin, Yvonne C., "Use of Structure-Activity Data To Compare Structure-Based Clustering Methods and Descriptors for Use in Compound Selection," *Journal of Chemical Information and Computer Sciences*, American Chemical Society, 1996, vol. 36, No. 3, pp. 572-584.

Cummins, David J. et al., "Molecular Diversity in Chemical Databases: Comparison of Medicinal Chemistry Knowledge Bases and Databases of Commercially Available Compounds," *Journal of Chemical Information and Computer Sciences*, American Chemical Society, 1996, vol. 36, No. 4, pp. 750-763.

Domine, D. et al., "Non-Linear Mapping for Structure-Activity and Structure-Property Modelling," *Journal of Chemometrics*, John Wiley & Sons, Ltd., vol. 7, No. 4, Jul.-Aug. 1993, pp. 227-242.

Rotstein, S.H. and Murcko, M., "GroupBuild: A Fragment-Based Method for *De Novo* Drug Design," *Journal of Medicinal Chemistry*, American Chemical Society, vol. 36, No. 12, 1993, pp. 1700-1710.

Downs, Geoff M. and Barnard, John M., "Techniques for Generating Descriptive Fingerprints in Combinatorial Libraries," *Journal of Chemical Information and Computer Sciences*, American Chemical Society, 1997, vol. 37, No. 1, pp. 59-61.

Gillet, Valerie J., "Background Theory of Molecular Diversity," *Molecular Diversity in Drug Design*, Kluwer Academic Publishers, 1999, pp. 43-65.

Good, Andrew C. and Lewis, Richard A., "New Methodology for Profiling Combinatorial Libraries and Screening Sets: Cleaning Up the Design Process with HARPick," *Journal of Medicinal Chemistry*, American Chemical Society, 1997, vol. 40, No. 24, pp. 3926-3936.

Pal, N.R. and Eluri, V.K., "Two Efficient Connectionist Schemes for Structure Preserving Dimensionality Reduction," *IEEE Transactions on Neural Networks*, IEEE, vol. 9, No. 6, Nov. 1998, pp. 1142-1154.

Jamois, Eric A. et al., "Evaluation of Reagent-Based and Product-Based Strategies in the Design of Combinatorial Library Subsets," *Journal of Chemical Information and Computer Sciences*, American Chemical Society, Dec. 9, 1999 (Published on Web), vol. 40, No. 1, pp. 63-70.

Kim, H. et al., "Self-Organized Distributed Networks for Learning Highly Nonlinear Mapping," *Intelligent Engineering Systems Through Artificial Neural Networks*, American Society of Mechanical Engineers, vol. 4, 1994, pp. 109-114.

Leach, Andrew R. et al., "Implementation of a System for Reagent Selection and Library Enumeration, Profiling, and Design," *Jounal of Chemical and Computer Sciences*, American Chemical Society, 1999, vol. 39, No. 6, pp. 1161-1172.

Lobanov, Victor S. and Agrafiotis, Dimitris K., "Stochastic Similarity Selections from Large Combinatorial Libraries," *Journal of Chemical Information and Computer Sciences*, American Chemical Society, Jan. 21, 2000 (Published on Web), vol. 40, No. 2, pp. 460-470.

Matter, Hans and Pötter, Thorsten, "Comparing 3D Pharmacophore Triplets and 2D Fingerprints for Selecting Diverse Compound Subsets," *Journal of Chemical Information and Computer Sciences*, American Chemical Society, Oct. 29, 1999 (Published on Web), vol. 39, No. 6, pp. 1211-1225.

Matter, Hans, "Selecting Optimally Diverse Compounds from Structure Databases: A Validation Study of Two-Dimensional and Three-Dimensional Molecular Descriptors," *Journal of Medicinal Chemistry*, American Chemical Society, 1997, vol. 40, No. 8, pp. 1219-1229.

Sadowski, Jens and Kubinyi, Hugo, "A Scoring Scheme for Discriminating between Drugs and Nondrugs," *Journal and Medicinal Chemistry*, American Chemical Society, Aug. 1, 1998 (Published on Web), vol. 41, No. 18, pp. 3325-3329.

Schnur, Dora, "Design and Diversity Analysis of Large Combinatorial Libraries Using Cell-Based Methods," *Journal of Chemical Information and Computer Science*, American Chemical Society, Jan. 6, 1999 (Published on Web), vol. 39, No. 1, pp. 36-45.

Schuffenhauer, Ansgar et al., "Similarity Searching in Files of Three-Dimensional Chemical Structures: Analysis of the BIOSTER Database Using Two-Dimensional Fingerprints and Molecular Field Descriptors," *Journal of Chemical Information and Computer Science*, American Chemical Society, Dec. 22, 1999 (Published on Web), vol. 40, No. 2, pp. 295-307.

Turner, David B. et al., "Rapid Quantification of Molecular Diversity for Selective Database Acquisition," *Journal of Chemical Information and Chemical Science*, American Chemical Society, 1997, vol. 37, No. 1, pp. 18-22.

Wang, Jing and Ramnarayan, Kal, "Toward Designing Drug-Like Libraries: A Novel Computational Approach for Prediction of Drug Feasibility of Compounds," *Journal of Combinatorial Chemistry*, American Chemical Society, Oct. 19, 1999 (Published on Web), vol. 1, No. 6, pp. 524-533.

Gasteiger, J. et al., "Assessment of the Diversity of Combinatorial Libraries by an Encoding of Molecular Surface Properties," *Abstracts of Papers Part 1: 211th ACS National Meeting*, Mar. 24-28, 1996, p. 70-CINF.

Haasan, Moises et al., "Optimization and visualization of molecular diversity of combinatorial libraries," *Molecular Diversity*, ESCOM Science Publishers B.V., 1996, vol. 2, No. 1/2, pp. 64-74.

Bellman, R.E., *Adaptive Control Processes: A Guided Tour*, Princeton Univ. Press, Princeton, NJ (1961), entire book submitted.

Bezdek, J.C., *Pattern Recognition with Fuzzy Objective Function Algorithms*, Plenum Press, New York, NY (1981), entire book submitted.

Johnson, M.A., and Maggiora, G.M., *Concepts and Applications of Molecular Similarity*, John Wiley and Sons, New York, NY (1990), entire book submitted.

Kohonen, T., *Self-Organizing Maps*, Springer-Verlag, Berlin, Germany (1995), entire book submitted.

Oja, E., *Subspace Methods of Pattern Recognition*, Research Studies Press Ltd., Letchworth, England (1983), entire book submitted.

Agrafiotis, D.K., "A New Method For Analyzing Protein Sequence Relationships Based On Sammon Maps," *Protein Science*, Cambridge University Press, vol. 6, No. 2, Feb. 1997, pp. 287-293.

International Search Report issued Oct. 18, 1999, for Appl. No. PCT/US99/09963, 7 pages.

Amzel, L.M., "Structure-based drug design," *Current Opinion in Biotechnology*, vol. 9, No. 4, Aug. 1998, pp. 366-369.

Blaney, J.M. and Martin, E.J., "Computational approaches for combinatorial library design and molecular diversity analysis," *Current Opinion in Chemical Biology*, Current Biology Ltd., vol. 1, No. 1, Jun. 1997, pp. 54-59.

Brown, R.D. and Clark, D.E., "Genetic diversity: applications of evolutionary algorithms to combinatorial library design," *Expert Opinion on Therapeutic Patents*, vol. 8, No. 11, Nov. 1998, pp. 1447-1459.

Caflisch, A. and Karplus, M., "Computational combinatorial chemistry for de novo ligand design: Review and assessment," *Perspectives in Drug Discovery and Design*, ESCOM Science Publishers B.V., vol. 3, 1995, pp. 51-84.

Danheiser, S.L., "Current Trends in Synthetic Peptide and Chemical Diversity Library Design," *Genetic Engineering News*, May 1, 1994, pp. 10 and 31.

Eichler, U. et al., "Addressing the problem of molecular diversity," *Drugs of the Future*, Prous Science, vol. 24, No. 2, 1999, pp. 177-190.

Felder, E.R. and Poppinger, D., "Combinatorial Compound Libraries for Enhanced Drug Discovery Approaches," *Advances in Drug Research*, Academic Press, vol. 30, 1997, pp. 112-199.

Geysen, H.M. and Mason, T.J., "Screening Chemically Synthesized Peptide Libraries for Biologically-Relevant Molecules," *Bioorganic & Medicinal Chemistry Letters*, Pergamon Press Ltd., vol. 3, No. 3, 1993, pp. 397-404.

Gobbi, A. et al., "New Leads By Selective Screening of Compounds From Large Databases," *Abstracts of Papers Part 1: 213th ACS National Meeting*, American Chemical Society, Apr. 13-17, 1997, p. 67-CINF.

Houghten, R.A. et al., "The Use Of Synthetic Peptide Combinatorial Libraries for the Identification of Bioactive Peptides," *Peptide Research*, vol. 5, No. 6, 1992, pp. 351-358.

Klopman, G., "Artificial Intelligence Approach to Structure-Activity Studies. Computer Automated Structure Evaluation of Biological Activity of Organic Molecules," *Journal of the American Chemical Society*, American Chemical Society, vol. 106, No. 24, 1984, pp. 7315-7321.

Lajiness, M.S. et al., "Implementing Drug Screening Programs Using Molecular Similarity Methods," *QSAR: Quantitative Structure-Activity Relationships in Drug Design*, Alan R. Liss, Inc., 1989, pp. 173-176.

Loew, G.H. et al., "Strategies for Indirect Computer-Aided Drug Design," *Pharmaceutical Research*, Plenum Publishing Corporation, vol. 10, No. 4, 1993, pp. 475-486.

Lynch, M.F. et al., "Generic Structure Storage and Retrieval," *Journal of Chemical Information and Computer Sciences*, American Chemical Society, vol. 25, No. 3, Aug. 1985, pp. 264-270.

Myers, P.L. et al., "Rapid, Reliable Drug Discovery," *Today's Chemist At Work*, American Chemical Society, vol. 6, No. 7, Jul./Aug. 1997, pp. 46-48, 51 & 53.

Pabo, C.O. and Suchanek, E.G., "Computer-Aided Model-Building Strategies for Protein Design," *Biochemistry*, American Chemical Society, vol. 25, No. 20, 1986, pp. 5987-5991.

Saudek, V. et al., "Solution Conformation of Endothelin-1 by H NMR, CD, and Molecular Modeling," *International Journal of Peptide Protein Research*, Munksgaard International Publishers Ltd., vol. 37, No. 3, 1991, pp. 174-179.

Singh, J. et al., "Application of Genetic Algorithms to Combinatorial Synthesis: A Computational Approach to Lead Identification and Lead Optimization," *J. Am. Chem. Soc.*, American Chemical Society, vol. 118, No. 7, Feb. 7, 1996, pp. 1669-1676.

Van Drie, J.H. and Lajiness, M.S., "Approaches to virtual library design," *Drug Discovery today*, Elsevier Science Ltd., vol. 3, No. 6, Jun. 1998, pp. 274-283.

Walters, W.P. et al., "Virtual screening—an overview," *Drug Discovery today*, Elsevier Science Ltd., vol. 3, No. 4, Apr. 1998, pp. 160-178.

Weber, L., "Evolutionary combinatorial chemistry: application of genetic algorithms," *Drug Discovery today*, Elsevier Science Ltd., vol. 3, No. 8, Aug. 1998, pp. 379-385.

Weber, L. et al., "Optimization of the Biological Activity of Combinatorial Compound Libraries by a Genetic Algorithm," *Angewandte Chemie International Edition in English*, VCH, vol. 34, No. 20, Nov. 3, 1995, pp. 2280-2282.

Graybill, T.L. et al., "Enhancing the Drug Discovery Process by Integration of High-Throughput Chemistry and Structure-Based Drug Design," Molecular Diversity and Combinatorial Chemistry: Libraries and Drug Discovery, American Chemical Society, 1996, pp. 16-27.

Saund, E., "Dimensionality-Reduction Using Connectionist Networks," *IEEE Transactions on Pattern Analysis and Machine Intelligence*, IEEE, vol. 11, No. 3, Mar. 1989, pp. 304-314.

"3DP gains drug research patent", *Chemistry in Britain*, The Royal Society of Chemistry, vol. 32, No. 1, Jan. 1996, p. 22.

"Accelerate the Discovery Cycle with Chem-X!", Source and date of publication unclear, 2 pages.

Agrafiotis, D. K., "Stochastic Algorithms for Maximizing Molecular Diversity", *Journal of Chemical Information and Computer Sciences*, American Chemical Society, vol. 37, No. 5, 1997, pp. 841-851.

Alsberg, B.K. et al., "Classification of pyrolysis mass spectra by fuzzy multivariate rule induction-comparison with regression K-nearest neighbour, nueral and decision-tree methods", *Analytica Chimica Acta*, Elsevier Science B.V., vol. 348, No. 1-3, Aug. 20, 1997, pp. 389-407.

Andrea, T.A. and Kalayeh, H., "Applications of Neural Networks in Quantitative Structure-Activity Relationships of Dihydrofolate Reductase Inhibitors", *Journal of Medicinal Chemistry*, American Chemical Society, vol. 34, No. 9, 1991, pp. 2824-2836.

Aoyama, T. et al., "Neural Networks Applied to Quantitative Structure-Activity Relationship", *Journal of Medicinal Chemistry*, American Chemical Society, vol. 33, No. 3, 1990, pp. 905-908.

Aoyama, T. and Ichikawa, H., "Obtaining the Correlation Indices between Drug Activity and Structural Parameters Using a Neural Network", *Chemical & Pharmaceutical Bulletin*, Pharmaceutical Society of Japan, vol. 39, No. 2, Feb. 1991, pp. 372-378.

"ArQule Inc", from http://www.bioportfolio.com/arqule/products.htm, 5 pages, (Mar. 18, 1998).

Baum, R.M., "Combinatorial Approaches Provide Fresh Leads for Medicinal Chemistry", *Chemical & Engineering News*, American Chemical Society, Feb. 7, 1994, pp. 20-26.

Bentley, J. L., "Multidimensional Binary Search Trees Used for Associative Searching", *Communications of the ACM*, Association for Computing Machinery, Inc., vol. 18, No. 9, Sep. 1975, pp. 509-517.

Bottou, L. and Vapnik, V. "Local Learning Algorithms", *Neural Computation*, Massachusetts Institute of Technology, vol. 4, No. 6, Nov. 1992, pp. 888-900.

Boulu, L.G. and Crippen, G.M., "Voronoi Binding Site Models: Calculation of Binding Modes and Influence of Drug Binding Data Accuracy", *Journal of Computational Chemistry*, John Wiley & Sons, Inc., vol. 10, No. 5, Jul./Aug. 1989, pp. 673-682.

Boulu, L.G. et al., "Voronoi Binding Site Model of a Polycyclic Aromatic Hydrocarbon Binding Protein", *Journal of Medicinal Chemistry*, American Chemical Society, vol. 33, No. 2, 1990, pp. 771-775.

Cacoullos, T., "Estimation of a Multivariate Density", *Annals of The Institute of Statistical Mathematics*, The Institute of Statistical Mathematics, vol. 18, No. 2, 1966, pp. 179-189.

Clark, R.D., "OptiSim: An Extended Dissimilarity Selection Method for Finding Diverse Representative Subsets", *Journal of Chemical Information and Computer Sciences*, American Chemical Society, vol. 37, No. 6, 1997, pp. 1181-1188.

Clark, D. E., and Westhead, D.R., "Evolutionary algorithms in computer-aided molecular design", *Journal of Computer-Aided Molecular Design*, ESCOM Science Publishers B.V., vol. 10, No. 4, Aug. 1996, pp. 337-358.

Cramer, III, R. D. et al., "Comparative Molecular Field Analyisis (CoMFA). 1. Effect of Shape on Binding of Steroids to Carrier Proteins", *Journal of the American Chemical Society*, American Chemical Society, vol. 110, No. 18, Aug. 31, 1988, pp. 5959-5967.

Cramer, III, R. D. et al., "Substructural Analysis. A Novel Approach to the Problem of Drug Design", *Journal of Medicinal Chemistry*, vol. 17, No. 5, May 1974, pp. 533-535.

Crippen, G. M., "Voronoi Binding Site Models", *Journal of Computational Chemistry*, John Wiley & Sons, Inc., vol. 8, No. 7, Oct./Nov. 1987, pp. 943-955.

Friedman, J. H. et al., "An Algorithm for Finding Best Matches in Logarithmic Expected Time", *ACM Transactions on Mathematical Software*, Association for Computational Machinery, vol. 3, No. 3, Sep. 1977, pp. 209-226.

Friedman, J.H., "Fitting Functions To Noisy Data In High Dimensions", Department of Statistics- Stanford University Technical Report No. 101, (Aug. 1988), pp. 1-36.

Gallop, M. A. et al., "Applications of Combinatorial Technologies to Drug Discovery. 1. Background and Peptide Combinatorial Libraries", *Journal of Medicinal Chemistry*, American Chemical Society, vol. 37, No. 9, Apr. 29, 1994, pp. 1233-1251.

Ghose, A. K. and Crippen, G.M., "Use of Physicochemical Parameters in Distance Geometry and Related Three-Dimensional Quantitative Structure-Activity Relationships: A Demonstration Using *Escherichia coli* Dihydrofolate Reductase Inhibitors", *Journal of Medicinal Chemistry*, American Chemical Society, vol. 28, No. 3, 1985, pp. 333-346.

Good, A. C. et al., "Structure-Activity Relationships from Molecular Similarity Matrices", *Journal of Medicinal Chemistry*, American Chemical Society, vol. 36, No. 4, Feb. 19, 1993, pp. 433-438.

Gordon, E. M. et al., "Applications of Combinatorial Technologies to Drug Discovery. 2. Combinatorial Organic Synthesis, Library Screening Strategies, and Future Directions", *Journal of Medicinal Chemistry*, American Chemical Society, vol. 37, No. 10, May 13, 1994, pp. 1385-1401.

Hartigan, J. A., "Representation of Similarity Matrices By Trees", *Journal of the American Statistical Association*, vol. 62, No. 320, Dec. 1967, pp. 1140-1158.

Hopfinger, A. J., "A QSAR Investigation of Dihydrofolate Reductase Inhibition by Baker Triazines Based upon Nolecular Shape Analysis", *Journal of the American Chemical Society*, American Chemical Society, vol. 102, No. 24, Nov. 19, 1980, pp. 7196-7206.

Jackson, R. C., "Update on computer-aided drug design", *Current Opinion in BIOTECHNOLOGY*, Current Biology Ltd., vol. 6, Dec. 1995, pp. 646-651.

Kim, K. H., "Comparative molecular field analysis(CoMFA)", *Molecular Similarity in Dug Design*, ed. P. M. Dean, Blackie Academic & Professional, 1995, Ch. 12, pp. 291-331.

Kohonen, T., "Self-Organized Formation of Topologically Correct Feature Maps", *Biological Cybernetics*, Springer-Verlag, vol. 43, No. 1, 1982, pp. 59-69.

Koile, K. and Shapiro, R., "Building A Collaborative Drug Design System", *Proceedings of the 25h Hawaii International Conference on System Sciences*, IEEE, 1992, pp. 706-716.

Kowalski, B. R. and Bender, C. F., "Pattern Recognition. II. Linear and Nonlinear Methods for Displaying Chemical Data", *Journal of the American Chemical Society*, American Chemical Society, vol. 95, No. 3, Feb. 7, 1973, pp. 686-693.

Kruskal, J. B., "Nonmetric Multidimensional Scaling: A Numerical Method", *Psychometrika*, vol. 29, No. 2, Jun. 1964, pp. 115-129.

Lengauer, T. and Rarey, M., "Computational methods for biomolecular docking", *Current Opinion in Structural Biology*, Current Biology Ltd, vol. 6, No. 3, Jun. 1996, pp. 402-406.

Luke, B. T., "Evolutionary Programming Applied to the Development of Quantitative Structure-Activity Relationships and Quantitative Structure-Property Relationships", *Journal of Chemical Information and Computer Sciences*, American Chemical Society, vol. 34, No. 6, Nov./Dec. 1994, pp. 1279-1287.

Martin, E. J. et al., "Does Combinatorial Chemistry Obviate Computer-Aided Drug Design?", *Reviews in Computational Chemistry*, VCH Publishers, Inc., vol. 10, 1997, pp. 75-99.

Martin, E. J. et al., "Measuring Diversity: Expermental Design of Combinatorial Libraries for Drug Discovery", *Journal of Medicinal Chemistry*, American Chemical Society, vol. 38, No. 9, Apr. 28, 1995, pp. 1431-1436.

McMartin, C. and Bohacek, R.S., "QXP: Powerful, rapid computer algorithms for structure-based drug-design", *Journal of Computer-Aided Molecular Design*, Kluwer Academic Publishers, vol. 11, No. 4, Jul. 1997, pp. 333-344.

Mezey, P. G. and Walker, P.D., "Fuzzy molecular fragments in drug research", *Drug Discovery today*, Vol. 2, No. 4, Apr. 1997, pp. 132-137.

Müller., "On the paradigm shift from rational to random design", *Journal of Molecular Structure (Theochem)*, Elsevier Science B.V., vol. 398-399, Special Issue, 1997, pp. 467-471.

Myers, P., "The Design Of A Universal, Informer™ Library", COMBICHEM, INC., 10 pages, Date unknown.

Oinuma, H. et al., "Neural Networks Applied to Structure-Activity Relationships", *Journal of Medicinal Chemistry*, vol. 33, No. 3, pp. 905-908, (1990).

Omohundro, S. M., "Bumptrees for Efficient Function, Constraint, and Classification Learning", *Advances in Neural Information Processing Systems* 3, Morgan Kaufmann, 1991, 7 pages, unknown.

Parrill, A. L., "Evolutionary and genetic methods in drug design", *Drug Discovery today*, Elsevier Science Ltd., vol. 1, No. 12, Dec. 1996, pp. 514-521.

Polanski, J., "A neural network for the simulation of biological systems", *Journal of Molecular Structure (Theochem)*, Elsevier Science Ltd., vol. 398-399, Special Issue, 1997, pp. 565-571.

Ramos-Nino, M. E. et al., "A comparison of quantitative structure-activity relationships for the effect of benzoic and cinnamic acids on *Listeria monocytogenes* using multiple linear regression, artificial neural network and fuzzy systems", *Journal of Applied Microbiology*, Society for Applied Bacteriology, vol. 82, No. 2, Feb. 1997, pp. 168-176.

Rogers, D. and Hopfinger, A. J., "Application of Genetic Function Approximation to Quantitative Structure-Activity Relationships and Quantitative Structure-Property Relationships", *Journal of Chemical Information and Computer Sciences*, American Chemical Society, vol. 34, No. 4, Jul./Aug. 1994, pp. 854-866.

Sammon, Jr., J. W., "A Nonlinear Mapping for Data Structure Analysis", *IEEE Transactions on Computers*, IEEE, vol. C-18, No. 5, May 1969, pp. 401-409.

Simon, Z. et al., "Mapping of Dihydrofolate-reductase Receptor Site by Correlation with Minimal Topological (Steric) Differences", *Journal of Theoretical Biology*, Acaddemic Press, Inc., vol. 66, No. 3, Jun. 7, 1997, pp. 485-495.

Smellie, A. S. et al., "Fast Drug-Receptor Mapping by Site-Directed Distances: A Novel Method of Predicting New Pharmacological Leads", *Journal of Chemical Information and Computer Sciences*, American Chemical Society, vol. 31, No. 3, Aug. 1991, pp. 386-392.

Specht, D. F., "A General Regression Neural Network", *IEEE Transactions on Neural Networks*, IEEE, vol. 2, No. 6, Nov. 1991, pp. 568-576.

Svozil, D. et al., "Neural Network Prediction of the Solvatochromic Polarity/Polarizability Parameter $TT^H_2$", *Journal of Chemical Information and Computer Sciences*, American Chemical Society, vol. 37, No. 2, 1997, pp. 338-342.

Todorov, N. P. and Dean, P. M., "Evaluation of a method for controlling molecular scaffold diversity in de novo ligand design", *Journal of Computer-Aided Molecular Design*, ESCOM Science Publishers B.V., vol. 11, 1997, pp. 175-192.

Torgerson, W. S., "Multidimensional Scaling: I. Theory and Method", *Psychometrika*, The Psychometric Society, vol. 17, No. 4, Dec. 1952, pp. 401-419.

Vapnik, V., "Principles of Risk Minimization for Learning Theory", *Advances in Neural Information Processing Systems* 4, Morgan Kaufmann Publishers, Inc., 1992, pp. 831-838.

Vapnik, V. and Bottou, L., "Local Algorithms for Pattern Recognition and Dependencies Estimation", *Neural Computation*, Massachusetts Institutes of Technology, vol. 5, No. 6, Nov. 1993, pp. 893-909.

Viswanadhan, V. N. et al., "Mapping the binding site of the nucleoside transporter protein: a 3D-QSAR study", *Biochimica et Biophysica Acta*, Elsevier Science Publishers B.V., vol. 1039, No. 3, 1990, pp. 356-366.

Warr, W. A., "Exploiting Molecular Diversity: Small Molecule Libraries for Drug Discovery", Report of Conference held in La Jolla, California, Jan. 23-25, 1995.

Westhead, D. R. et al., "A comparison of heuristic search algorithms for molecular docking", *Journal of Computer-Aided Molecular Design*, Kluwer Acaddemic Publishers, vol. 11, 1997, pp. 209-228.

Willett, P., "Genetic algorithms in molecular recognition and design", *Trends in Biotechnology*, Elsevier Science Publishers B.V., vol. 13, No. 12, Dec. 1995, pp. 516-521.

Willett, P. and Winterman, V., "A Comparison of Some Measures for the Determination of Inter-Molecular Structural Similarity Measures of Inter-Molecular Structural Similarity", *Quantitative Structure-Activity Relationships*, VCH, vol. 5, No. 1, Mar. 1986, pp. 18-25.

Zadeh, L. A., "Communication Fuzzy Algorithms", *Information and Control*, Academic Press Inc., vol. 12, No. 2, Feb. 1968, pp. 94-102.

Zadeh, L.A., "Fuzzy Sets", *Information and Control*, Academic Press Inc., vol. 8, No. 3, Jun. 1965, pp. 338-353.

International Search Report issued Apr. 21, 1998 for Appl. No. PCT/US97/20919, 6 pages.

International Search Report issued May 13, 1998, for Appl. No. PCT/US97/20918, 7 pages.

Aoyama, T. et al., "Neural Networks Applied to Sturcture-Activity Relationships," *Journal of Medicinal Chemistry*, American Chemical Society, vol. 33., No. 3, 1990, pp. 2583-2590.

Gasteiger, J. et al., "Analysis of the Reactivity of Single Bonds in Aliphatic Molecules by Statistical and Pattern Recognition Methods," *Journal of Chemical Information and Computer Sciences*, American Chemical Society, vol. 33, No. 3, 1993, pp. 385-394.

Guez, A. and Nevo, I., "Neural networks and fuzzy logic in clinical laboratory computing with application to integrated monitoring," *Clinica Chimica Acta*, Elsevier Science Publishers B.V., vol. 248, 1996, pp. 73-90.

Rouvray, D. H., "Similarity in Chemistry: Past, Present and Future," *Topics in Chemistry*, Springer-Verlag, vol. 173, 1995, pp. 1-30.

de Ridder, D. and Duin, R.P.W., "Sammon's mapping using neural networks: A comparison," *Pattern Recognition Letters*, Elsevier Science Publishers B.V., vol. 18, No. 11-13, 1997, pp. 1307-1316.

International Search Report issued Sep. 24, 2001 for Appln. No. PCT/US01/06217, 3 pages.

Chang, G. et al., An Internal Coordinate Monte Carlo Method for Searching Conformational Space, *Journal of the American Chemical Society*, American Chemical Society, vol. III, Jun. 1989, No. 12, pp. 4379-4386.

Crippen, G.M. and Havel, T.F., *Distance Geometry and Molecular Design Conformation*, Research Studies Press Ltd., 1988, entire book submitted.

Feuston, B. et al., "Comparison of Knowledge-Based and Distance Geometry Approaches for Generation of Molecular Conformations," *Journal of Information and Computer Sciences*, American Chemical Society, vol. 41, No. 3, Apr. 12, 2001 (Published on Web), pp. 754-763.

Ferguson, D. and Raber, D., "A New Approach to Probing Conformational Space with Molecular Mechanics: Random Incremental Pulse Search," *Journal of the American Chemical Society*, American Chemical Society, vol. 111, No. 12, 1989, pp. 4371-4378.

Halgren, T. and Nachbar, R., "Merck Molecular Force Field. IV. Conformational Energies and Geometries for MMFF94*," *Journal of Computational Chemistry*, John Wiley & Sons, Inc., vol. 17, Nos. 5 & 6, 1996, pp. 587-615.

Halgren, T., "Merck Molecular Force Field. V. Extension of MMFF94 Using Experimental Data, Additional Computational Data, and Empirical Rules*," *Journal of Computational Chemistry*, John Wiley & Sons, Inc., vol. 17, Nos. 5 & 6, Apr. 1996, pp. 616-641.

Huang, E. et al., "Distance geometry generates native-like folds for small helical proteins using the consensus distances of predicted structures," *Protein Science*, The Protein Society, vol. 7, No. 9, Sep. 1998, pp. 1998-2003.

Havel, T.F. and Wüthrich, K., "An Evaluation of the Combined Use of Nuclear Magnetic Resonance and Distance Geometry for the Determination of Protein Conformations in Solution," *Journal of Molecular Biology*, Academic Press Inc., vol. 182, No. 2, Mar. 20, 1985, pp. 281-294.

Havel, T.F. and Snow, M.E., "A New Method for Building Protein Conformations from Sequence Alignments with Homologues of Known Structure," *Journal of Molecular Biology*, Academic Press Limited, vol. 217, No. 1, Jan. 5, 1991, pp. 1-7.

Havel, T. and Wüthrich, K., "A Distance Geometry Program for Determining the Structures of Small Proteins and Other Macromolecules from Nuclear Magnetic Resonance Measurements of Intramolecular $^1$H-$^1$H Proximities in Solution," *Bulletin of Mathematical Biology*, Pergamon Press, vol. 46, No. 4, 1984, pp. 673-698.

Jain, A. and Mao, J., "Artificial Neural Networks: A Tutorial," IEEE, Mar. 1996, pp. 31-44.

Jorgensen, W. and Tirado-Rives, J., "Monte Carlo vs. Molecular Dynamics for Conformational Sampling," *Journal of Physical Chemistry*, American Chemical Society, vol. 100, No. 34, Aug. 22, 1996, pp. 14508-14513.

Kuszewski, J. et al., "Sampling and efficiency of metric matrix, distance geometry: A novel partial metrization algorithm," *Journal of Biomelecular NMR*, Escom Science Publishers B.V., vol. 2, No. 1, Jan. 1992, pp. 33-56.

Leach, A., "A Survey of Methods for Searching the Conformational Space of Small and Medium-Sized Molecules," *Reviews in Computational Chemistry*, VCH Publishers, vol. 2, pp. 1-55.

Meng, E. et al., "Orientational Sampling and Rigid-Body Minimization in Molecular Docking," PROTEINS: *Structure, Function, and Genetics*, Wiley-Liss, Inc., vol. 17, No. 3, 1993, pp. 266-278.

Munmenthaler, Ch. And Braun, W., "Automated Assignment of Simulated and Experimental NOESY Spectra of Proteins by Feedback Filtering and Self-correcting Distance Geometry," *Journal of Molecular Biology*, Academic Press Limited, vol. 254, No. 3, Dec. 1, 1995, pp. 465-480.

Porto, V.W. et al., "Alternative Neural Network Training Methods," *IEEE Expert*, IEEE, vol. 10, No. 4, Jun. 1995, pp. 16-22.

Saunders, M., "Stochastic Exploration of Molecular Mechanics Energy Surfaces. Hunting for the Global Minimum," *Journal of the American Chemical Society*, American Chemical Society, vol. 109, May 13, 1987, pp. 3150-3152.

Spellmeyer, D. et al., "Conformational analysis using geometry methods," *Journal of Molecular Graphics & Modelling*, Elsevier Science, Inc., vol. 15, No. 1, Feb. 1997, pp. 18-36.

International Search Report for Appln. No. PCT/US01/08974 issued May 28, 2002, 7 pages.

Kim, J. et al., "Multiple Neural Networks using the Reduced Input Dimension," *Proceedings of the International Conference on Accoustics, Speech, and Signal Processing*, IEEE, vol. 2, Apr. 19-22, 1994, pp. II-601 to II-604.

Cohen, N.C. et al., "Molecular Modeling Software and Methods for Medicinal Chemistry," *Journal of Medicinal Chemistry*, American Chemical Society, vol. 33, No. 3, Mar. 1990, pp. 883-894.

Linusson, A. et al., "Statistical Molecular Design of Buiding Blocks for Combinatorial Chemistry," *Journal of Medicinal Chemistry*, American Chemical Society, vol. 43, No. 7, Mar. 8, 2000 (Published on Web), pp. 1320-1328.

\* cited by examiner

METHOD, SYSTEM, AND COMPUTER PROGRAM PRODUCT FOR REPRESENTING OBJECT RELATIONSHIPS IN A MULTIDIMENSIONAL SPACE

CROSS-REFERENCE TO RELATED APPLICATIONS

This application claims the benefit of U.S. Provisional Application No. 60/194,307, filed Apr. 3, 2000.

The following applications of common assignee are related to the present application, and are herein incorporated by reference in their entireties:

"System, Method and Computer Program Product for Representing Object Relationships in a Multidimensional Space," Ser. No. 09/814,160, filed Mar. 22, 2001;

"Method, System and Computer Program Product for Nonlinear Mapping of Multidimensional Data," Ser. No. 09/303,671, filed May 3, 1999;

"System, Method and Computer Program Product for Representing Proximity Data in a Multidimensional Space," Ser. No. 09/073,845, filed May 7, 1998;

"Method, System, and Computer Program Product for Representing Similarity/Dissimilarity Between Chemical Compounds," Ser. No. 08/963,872, filed Nov. 4, 1997;

"System, Method and Computer Program Product for the Visualization and Interactive Processing and Analysis of Chemical Data," Ser. No. 08/963,872, filed Nov. 4, 1997; and "Stochastic Algorithms for Maximizing Molecular Diversity," Ser. No. 60/030,187, filed November 4, 1996.

BACKGROUND OF THE INVENTION

1. Field of the Invention

The present invention relates to information representation, information cartography and data mining. The present invention also relates to pattern analysis and representation, and, in particular, representation of object relationships in a multidimensional space.

2. Related Art

Similarity is one of the most ubiquitous concepts in science. It is used to analyze and categorize phenomena, rationalize behavior and function, and design new entities with desired or improved properties. It is employed in virtually all scientific and technical fields, and particularly in data mining and information retrieval. Similarity (or dissimilarity) is typically quantified in the form of a numerical index derived either through direct observation, or through the measurement of a set of characteristic attributes, which are subsequently combined in some form of similarity or distance measure. For large collections of objects, similarities are usually described in the form of a matrix that contains some or all of the pairwise relationships between the objects in the collection. Unfortunately, pairwise similarity matrices do not lend themselves for numerical processing and visual inspection. A common solution to this problem is to embed the objects into a low-dimensional Euclidean space in a way that preserves the original pairwise relationships as faithfully as possible. This approach, known as multidimensional scaling (MDS) (Torgeson, W. S., *Psychometrika* 17:401–419 (1952); Kruskal, J. B., *Psychometrika* 29:115–129 (1964)) or nonlinear mapping (NLM) (Sammon, J. W., *IEEE Trans. Comp.* C18:401–409 (1969)), converts the data points into a set of real-valued vectors that can subsequently be used for a variety of pattern recognition and classification tasks.

Multidimensional scaling originated in the field of mathematical psychology and has two primary applications: 1) reducing the dimensionality of high-dimensional data in a way that preserves the original relationships of the data objects, and 2) producing Cartesian coordinate vectors from data supplied directly in the form of similarities or proximities, so that they can be analyzed with conventional statistical and data mining techniques.

Given a set of k objects, a symmetric matrix, $r_{ij}$, of relationships between these objects, and a set of images on a m-dimensional display plane $\{y_i, i=1, 2, \ldots, k; y_i \in \Re^m\}$, the problem is to place $y_i$ onto the plane in such a way that their Euclidean distances $d_{ij}=\|y_i-y_j\|$ approximate as closely as possible the corresponding values $r_{ij}$. The quality of the projection is determined using a sum-of-squares error function such as Kruskal's stress:

$$S = \sqrt{\frac{\sum_{i<j}(d_{ij}-r_{ij})^2}{\sum_{i<j}r_{ij}^2}} \tag{1}$$

which is numerically minimized in order to find the optimal configuration. The actual embedding is carried out in an iterative fashion by: 1) generating an initial set of coordinates $y_i$, 2) computing the distances $d_{ij}$, 3) finding a new set of coordinates $y_i$ using a steepest descent algorithm such as Kruskal's linear regression or Guttman's rank-image permutation, and 4) repeating steps 2 and 3 until the change in the stress function falls below some predefined threshold.

A particularly popular implementation is Sammon's nonlinear mapping algorithm (Sammon, J. W. IEEE Trans. Comp., 1969). This method uses a modified stress function:

$$E = \frac{\sum_{i<j}^{k}\frac{[r_{ij}-d_{ij}]^2}{r_{ij}}}{\sum_{i<j}^{k}r_{ij}} \tag{2}$$

which is minimized using steepest descent. The initial coordinates, $y_i$, are determined at random or by some other projection technique such as principal component analysis, and are updated using Eq. 3:

$$y_{ij}(t+1) = y_{ij}(t) - \lambda\Delta_{ij}(t) \tag{3}$$

where t is the iteration number and $\lambda$ is the learning rate parameter, and $$\Delta_{ij}(t) = \frac{\frac{\partial E(t)}{\partial y_{ij}(t)}}{\left|\frac{\partial^2 E(t)}{\partial y_{ij}(t)^2}\right|} \tag{4}$$

There is a wide variety of MDS algorithms involving different error functions and optimization heuristics, which are reviewed in Schiffman, Reynolds and Young, *Introduc-* tion to Multidimensional Scaling, Academic Press, New York (1981); Young and Hamer, Multidimensional Scaling: History, Theory and Applications, Erlbaum Associates, Inc., Hillsdale, N.J. (1987); Cox and Cox, Multidimensional Scaling, Number 59 in Monographs in Statistics and Applied Probability, Chapman-Hall (1994), and Borg, I., Groenen, P., Modern Multidimensional Scaling, Springer-Verlag, New York, (1997). The contents of these publications are incorporated herein by reference in their entireties.

Unfortunately, the quadratic nature of the stress function (Eqs. 1 and 2, and their variants) make these algorithms impractical for large data sets containing more than a few hundred to a few thousand items. Several attempts have been devised to reduce the complexity of the task. Chang and Lee (Chang, C. L., and Lee, R. C. T., IEEE Trans. Syst., Man, Cybern., 1973, SMC-3, 197–200) proposed a heuristic relaxation approach in which a subject of the original objects (the frame) are scaled using a Sammon-like methodology, and the remaining objects are then added to the map by adjusting their distances to the objects in the frame. An alternative approach proposed by Pykett (Pykett, C. E., Electron. Lett., 1978, 14, 799–800) is to partition the data into a set of disjoint clusters, and map only the cluster prototypes, i.e. the centroids of the pattern vectors in each class. In the resulting two-dimensional plots, the cluster prototypes are represented as circles whose radii are proportional to the spread in their respective classes. Lee, Slagle and Blum (Lee, R. C. Y., Slagle, J. R., and Blum, H., IEEE Trans. Comput., 1977, C-27, 288–292) proposed a triangulation method which restricts attention to only a subset of the distances between the data samples. This method positions each pattern on the plane in a way that preserves its distances from the two nearest neighbors already mapped. An arbitrarily selected reference pattern may also be used to ensure that the resulting map is globally ordered. Biswas, Jain and Dubes (Biswas, G., Jain, A. K., and Dubes, R. C., IEEE Trans. Pattern Anal. Machine Intell., 1981, PAMI-3(6), 701–708) later proposed a hybrid approach which combined the ability of Sammon's algorithm to preserve global information with the efficiency of Lee's triangulation method. While the triangulation can be computed quickly compared to conventional MDS methods, it tries to preserve only a small fraction of relationships, and the projection may be difficult to interpret for large data sets.

The methods described above are iterative in nature, and do not provide an explicit mapping function that can be used to project new, unseen patterns in an efficient manner. The first attempt to encode a nonlinear mapping as an explicit function is due to Mao and Jain (Mao, J., and Jain, A. K., IEEE Trans. Neural Networks 6(2):296–317 (1995)). They proposed a 3-layer feed-forward neural network with n input and m output units, where n and m are the number of input and output dimensions, respectively. The system is trained using a special back-propagation rule that relies on errors that are functions of the inter-pattern distances. However, because only a single distance is examined during each iteration, these networks require a very large number of iterations and converge extremely slowly.

An alternative methodology is to employ Sammon's nonlinear mapping algorithm to project a small random sample of objects from a given population, and then "learn" the underlying nonlinear transform using a multilayer neural network trained with the standard error back-propagation algorithm or some other equivalent technique (see for example, Haykin, S. Neural Networks: A Comprehensive Foundation. Prentice-Hall, 1998). Once trained, the neural network can be used in a feed-forward manner to project the remaining objects in the plurality of objects, as well as new, unseen objects. Thus, for a nonlinear projection from n to m dimensions, a standard 3-layer neural network with n input and m output units is used. Each n-dimensional object is presented to the input layer, and its coordinates on the m-dimensional nonlinear map are obtained by the respective units in the output layer (Pal, N. R. Eluri, V. K., IEEE Trans. Neural Net., 1142–1154 (1998)).

The distinct advantage of this approach is that it captures the nonlinear mapping relationship in an explicit function, and allows the scaling of additional patterns as they become available, without the need to reconstruct the entire map. However, as it was originally proposed, the method can only be used for dimension reduction, and requires that the input patterns be supplied as real vectors.

Hence there is a need for a method that can efficiently process large data sets, e.g., data sets containing hundreds of thousands to millions of items, and can be used with a wide variety of pattern representations and/or similarity distance functions. Moreover, there is a need for a method that is incremental in nature, and allows the mapping of new samples as they become available, without the need to reconstruct an entire map.

SUMMARY OF THE INVENTION

The present invention provides a method, system, and computer program product for representing a set of objects in a multidimensional space given a set of pairwise relationships between some of these objects.

In an embodiment, a plurality of objects are selected for comparison. At least some of all possible pairs of objects from the selected plurality of objects are compared, and the resulting pairwise relationships are recorded in a database. These pairwise relationships are used to embed the selected plurality of objects into an m-dimensional Euclidean space in such a way that the proximities (distances) of the selected objects in the m-dimensional Euclidean space approximate as closely as possible the corresponding pairwise relationships. Hereafter, we shall refer to the coordinates of objects in this m-dimensional Euclidean space as "output coordinates" or "output features". In addition, a set of n attributes are determined for each of the selected plurality of objects. Hereafter, we shall refer to these n attributes as "input coordinates" or "input features". Thus, each of the selected plurality of objects is associated with an n-dimensional vector of input features and an m-dimensional vector of output features. A supervised machine learning approach is then employed to determine a functional relationship between the n-dimensional input and m-dimensional output vectors, and that functional relationship is recorded. Hereafter, we shall refer to this functional relationship as "mapping function".

In an embodiment, a pairwise relationships database is created by having one or more humans, apparatuses or computer processes initially select a plurality of objects that are presented to one or more humans, apparatuses or computer processes for pairwise comparison. Hereafter, the one or more humans, apparatuses or computer processes to which the objects are presented will be referred to as "subjects". In addition, one or more experts, apparatuses or computer processes select a set of n attributes or input features used to characterize each of the selected plurality of objects. A computer program product is used to select pairs of objects from the selected plurality of objects, and present these pairs of objects to the subjects. The computer program product then receives data from the subjects about the relationships of the objects presented to them. The relationship data from the subjects is recorded in the database and is used to embed the selected plurality of objects into an m-dimensional Euclidean space in such a way that the proximities (distances) of the selected plurality objects in that m-dimensional space approximate their corresponding relationships to a significant extent.

In an embodiment, output features for additional objects that were not part of the selected plurality of objects may be determined by computing their input features and evaluating the mapping function determined from the original relationship data using the supervised machine learning approach.

In an embodiment, relationships between the selected plurality of objects or additional objects that were not part of the selected plurality of objects may be determined by embedding the objects into the m-dimensional space and measuring their corresponding distances in that m-dimensional space.

In an embodiment, the mapping function is determined using one or more artificial neural networks.

In an embodiment, the n input features associated with an object represent the relationships of that object to n other reference objects.

Further embodiments, features, and advantages of the present invention, as well as the structure and operation of the various embodiments of the present invention, are described in detail below with reference to the accompanying figures.

BRIEF DESCRIPTION OF THE DRAWINGS/FIGURES

DETAILED DESCRIPTION OF THE INVENTION

Figure 1:
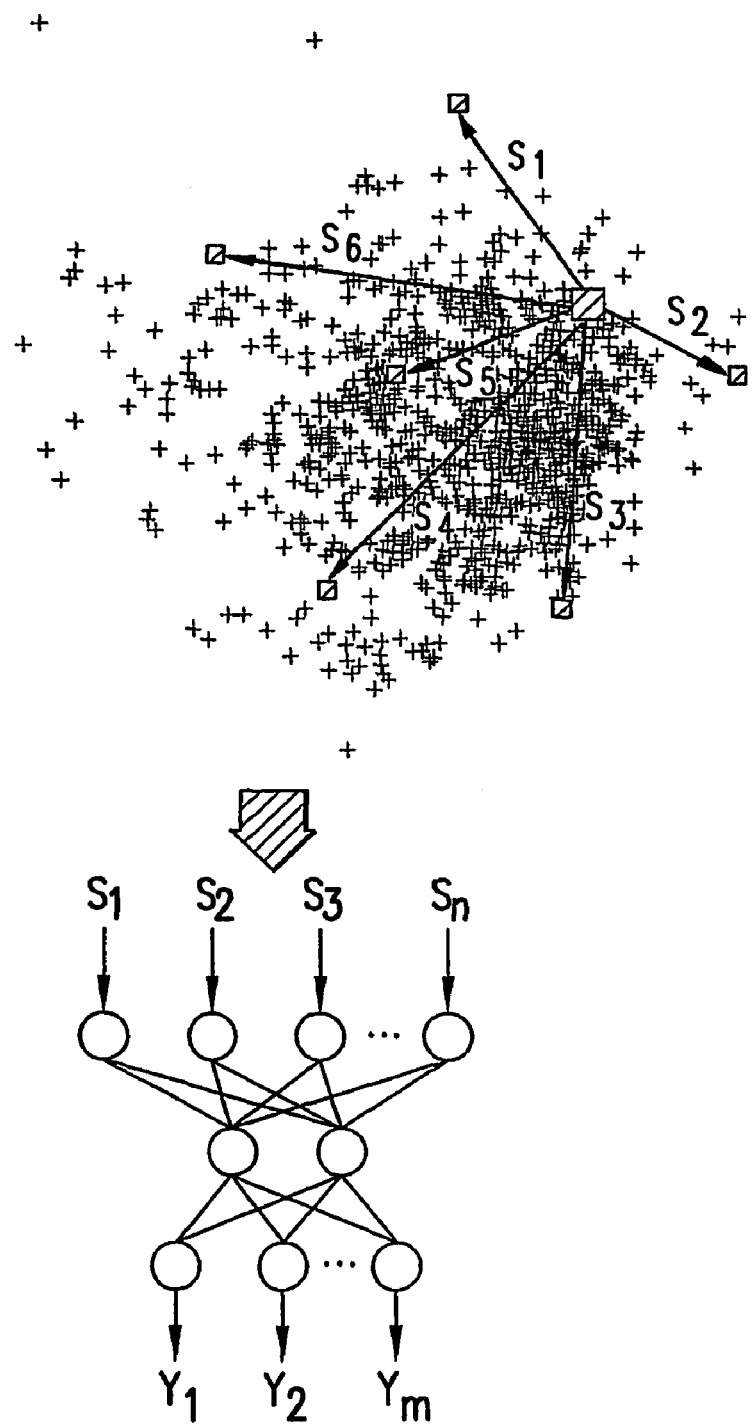
FIG. 1 illustrates the process of comparing a selected object to each of a set of n reference objects and using the results of this comparison as a fixed-length (n-dimensional) real vector that can be used as an input to the supervised machine learning technique in the manner of the present invention.

Preferred embodiments of the present invention are now described with references to the figures, where like reference numbers indicate identical or functionally similar elements. Also in the figures, the left most digit(s) of each reference number corresponds to the figure in which the reference number is first used. While specific configurations and arrangements are discussed, it should be understood that this is done for illustrative purposes only. One skilled in the relevant art will recognize that other configurations and arrangements can be used without departing from the spirit and scope of the invention. It will also be apparent to one skilled in the relevant art that this invention can also be employed in a variety of other devices and applications.

Nomenclature

The method of object representation, as described herein, can find applications in a variety of fields. "Objects" include, for example, items found in nature; chemical compounds; processes; machines; compositions of matter; articles of manufacture; electrical devices; mechanical devices; financial data; financial instruments; financial trends; financial related traits and characteristics; marketing data; consumer profiles; census information; voting demographics; software products; human traits and characteristics; scientific properties, traits, and characteristics; and other tangible or intangible items that can be characterized by numerical measurement.

"Pairwise relationships" or "pairwise relationship measurements" provide a numerical measure of the relationship between two objects. This relationship may represent the similarity or dissimilarity between two objects, or some other form of association. In one embodiment, pairwise relationships are determined using a function that takes as input numerical attributes that characterize two objects. Such functions can take a variety of forms including, but not limited to, the Minkowski metrics, Hamming distance, Tanimoto (or Jacard) coefficient, Dice coefficient, and many others.

These pairwise relationships are used to embed the selected plurality of objects into an m-dimensional Euclidean space in such a way that the proximities (distances) of the selected objects in the m-dimensional Euclidean space approximate as closely as possible the corresponding pairwise relationships. This process is referred to as "mapping" and the coordinates of the objects in the m-dimensional Euclidean space as "output coordinates" or "output features". In addition, a set of n attributes are determined for each of the selected plurality of objects. These attributes are referred to as "input coordinates" or "input features". The functional relationship between the n-dimensional input and m-dimensional output vectors determined by the supervised machine learning approach is referred to as "mapping function".

Overview

The present invention uses supervised machine learning techniques to map members of a set of objects in a multi-dimensional space in a manner that preserves to a significant extent known relationships between some of these objects. In particular, this specification describes a system, method and computer program product for embedding a set of objects into an m-dimensional Cartesian coordinate space, in such a way that the proximities of the objects in that m-dimensional space approximate the corresponding pairwise relationships. In addition, this specification describes a system, method and computer program product for embedding additional objects that are not part of the selected plurality of objects into that m-dimensional space. Without limitation but by way of illustration only, objects include, for example, items found in nature; chemical compounds; processes; machines; compositions of matter; articles of manufacture; electrical devices; mechanical devices; financial data; financial instruments; financial trends; financial related traits and characteristics; marketing data; consumer profiles; census information; voting demographics; software products; human traits and characteristics; scientific properties, traits, and characteristics; and other tangible or intangible items that can be characterized by fields of data.

In an embodiment, the present invention involves four steps: 1) pairwise relationship data generation, in which pairwise relationships between objects in a selected plurality of objects are generated and recorded in a database, 2) nonlinear mapping, in which the selected plurality of objects are embedded into an m-dimensional space in such a way that the proximities of the objects in that m-dimensional space approximate the original pairwise relationships to a significant extent, and 3) machine learning, in which a set of n attributes are measured or computed for each of the objects, and a mapping function that encodes the relationship between these n attributes and the coordinates of the objects in the m-dimensional space is determined and recorded. Optionally, the same n attributes may be measured or computed for a new set of objects, and the mapping function may be evaluated to generate coordinates for this new set of objects in the m-dimensional space. Optionally, the coordinates of objects on the m-dimensional space may be used to determine their pairwise relationships.

In the following discussion, artificial neural networks are used as an exemplary embodiment of a supervised machine learning technique. However, it should be understood that they are used by way of example, and not limitation. It will be apparent to persons skilled in the relevant art that any other supervised machine learning technique capable of function approximation (e.g. partial least squares, etc) can be employed.

Pairwise Relationship Data Generation

According to the method of the invention, at least some of all possible pairs of objects (patterns) from a selected plurality of objects are compared, and the resulting pairwise relationships are recorded in a database. As would be apparent to one skilled in the relevant art given the discussion herein, there are a number of approaches that can be taken in accordance with the method of the invention to select objects to be compared.

When applying the method of the invention to the field of molecular similarity, for example, one approach for selecting objects (compounds) is to judiciously select a subset of diverse objects (compounds) that would serve to define a reasonable compound space for similarity/dissimilarity analysis. In an embodiment, a subset of about 100–1000 diverse compounds can be selected for pairwise comparison.

As would be apparent to one skilled in the relevant art given the discussion herein, objects selected in the above manner map from an n-dimensional vector space to an m-dimensional vector space. Objects selected in this manner and mapped to an m-dimensional vector space can serve as markers that define the properties associated with specific areas or regions of the m-dimensional vector space. New objects, which map to a specific area of the m-dimensional vector space, are likely to have properties similar to the selected compounds that map to the same specific area of the m-dimensional vector space. Thus, objects that map to the same specific area of the m-dimensional vector space are likely to be similar or related. Objects that map to different areas of the m-dimensional vector space are likely to be dissimilar or unrelated. The Euclidean distances between mapped compounds is a measure of their similarity/dissimilarity or relatedness.

A second approach for selecting objects for comparison is to select (e.g., randomly) a subset of objects from a database of objects of particular interest and have one or more humans, apparatuses or computer processes perform a pairwise comparison of the objects. For example, one or more humans, apparatuses or computer processes can present pairs of the selected objects to one or more humans, apparatuses or computer processes (subjects) for pairwise comparison, and the results of these comparisons by the subjects can be recorded. As described below, a computer program product can used to select pairs of objects from the selected plurality of objects, and present these pairs of objects to the subjects. The computer program product then receives data from the subjects about the relationships of the objects presented to them. The relationship data from the subjects is recorded in the database and is used to embed the selected plurality of objects into an m-dimensional Euclidean space, as described herein, in such a way that the proximities (distances) of the selected plurality objects in that m-dimensional space approximate their corresponding relationships to a significant extent.

Applying the second approach above to the field of molecular similarity, for example, compounds can be selected either at random, systematically, or semi-systematically from a computer database and presented to one or more chemists for pairwise comparison. The number of compounds selected should be statistically chosen so that the selected compounds are likely to be representative of the compounds in the database of interest. Thus, depending on the size of the database and the method used to select compounds, the number of compounds selected for comparison by the one or more chemists will vary. For example, in an embodiment about 100 to 1000 compounds might be selected for comparison by the one or more chemists.

This second selection approach can be used, for example, in the field of molecular similarity to mine a database of compounds and identify compounds similar to compounds having known therapeutic, agricultural or other commercial value. As described herein, the compounds selected from the database can be multidimensionally scaled to an m-dimensional vector space and used to determine one or more nonlinear mapping functions. These mapping functions can then be used to map other compounds in the same or a different database to the m-dimensional vector space in order to determine which compounds in the database may be commercially valuable. Compounds having known therapeutic, agricultural or other commercial value can be selected and mapped to the m-dimensional vector space to identify particular areas or regions of importance. New compounds which map to the same area or region of the m-dimensional vector space as the compounds having known commercial or therapeutic value are likely to be similar to the compounds having the known commercial therapeutic, agricultural or other commercial value.

As described below, in an embodiment of the invention pairwise relationship data about objects is generated and recorded in a database using a computer network (e.g., the INTERNET). This aspect of the invention is illustrated herein using an example embodiment of the invention from the field of molecular similarity.

In an embodiment of the present invention, similarity data about compounds of interest is received via a computer network from a plurality of scientist (e.g., chemists). A computer program product running on a first computer is used to select pairs of objects (compounds) from a database, and these selected objects (compounds) are then sent from the first computer via a computer network to scientists at a remote location. At the remote location, the selected pairs of objects (compounds) are presented to the scientists, for example, by a second computer, as compounds for pairwise similarity comparison. The scientists evaluate the similarity of the pairs of compounds presented to them and send data about the compounds via the computer network to the first computer.

In an embodiment, the data received from the scientists is stored in a database for subsequent retrieval. The pairwise similarity data from the scientists is used as described herein to develop a mapping function according to the invention. The mapping function can be derived using the similarity data from the scientists. As described herein, once determined, a mapping function according to the invention can be used to map additional compounds into the m-dimensional space, including compounds not presented to the scientists for similarity comparison, without the need for additional input from a scientist.

In an embodiment, the method of the invention comprises the steps of randomly selecting two compounds from the plurality of compounds selected for pairwise comparison; presenting the two compounds selected to a scientist; and receiving data from the scientist about the similarity of the compounds. These steps are repeated for additional pairs of compounds for as long as the scientist is willing to evaluate pairs of compounds. The selection of compounds in this embodiment can be performed by a computer program product running on an unattended computer. For example, in an embodiment, a computer program product running on a server receives similarity data from a plurality of scientists via the INTERNET.

The present invention is not limited to using a computer and a computer program product to receive similarity data. As would be apparent to persons skilled in the relevant art given the discussion herein, there are many other ways to receive similarity data about objects (e.g., a plurality of compounds). For example, a survey could be sent to a scientist by mail, which would ask the scientist to evaluate the similarity of compounds. Alternatively, a person could call a scientist using a telephone and ask the scientist questions about the compounds. Thus, it should be understood that the ways for receiving data described herein are presented by way of example only, and not limitation.

In an embodiment, personal and/or background data about the subjects providing similarity data is collected and used to develop tailored mapping functions according to the invention. For example, personal and/or background data about the scientists providing the similarity data for compounds as described herein is received from the scientists. This data can include, for example, data about the scientist's education, training, work experiences, research interests, et cetera. This data can then be used to further analysis the similarity data received from the scientists (e.g, where data is received from a plurality of scientists). Personal and/or background data can be used, for example, to determine how a particular group of scientists would classify the similarity of certain compounds of interest compared to another groups of scientists. The personal and/or background data can be used, for example, to determine how chemists from a first field of chemistry would classify the similarity of a set of compounds compared to chemists from a second field of chemistry. Other determinations about how a first group of scientists would classify the similarity of a set of compounds compared to a second group of scientists can also be made, as would be apparent to a person skilled in the relevant art given the discussion herein. Thus, it should be understood that the ways for using the personal and/or background data described herein are presented by way of example only, and not limitation. Furthermore, this feature of the invention is not limited to the field of molecular similarity. As would be apparent to a person skilled in the relevant art given the discussion herein, this feature of the invention can be applied to any other field.

When using the method of the invention, it is expected that information about some selected objects might be unknown or unavailable. As described herein, the present invention can be implemented using data that is incomplete, noisy, and/or corrupt. To illustrate this feature of the invention, assume that the data in Table 1, below, was receive according to the method of the invention from five subjects (i.e., S1, S2, S3, S4, and S5). The data in Table 1 represents how the five subjects might rate the similarity of five objects (A–E) on a scale of zero to one, where zero represents absolute similarity and one represent absolute dissimilarity. As can be seen by looking at Table 1, data about the similarity of the objects is incomplete, noisy, and/or corrupt.

In an embodiment of the invention, the similarity data from the five subjects is combined using averaging to produce the results in Table 2. This averaged data is then used to create a pairwise relationship database according to the invention. As would be apparent to a person skilled in the relevant art given the discussion herein, methods other than averaging can be used to combine the similarity data received from the subjects.

TABLE 1

|    | S1  | S2  | S3  | S4  | S5  |
|----|-----|-----|-----|-----|-----|
| AB | 0.5 | 0.7 | 0.6 |     |     |
| AC | 0.7 | 0.9 | 0.8 | 0.8 | 0.7 |
| AD | 0.6 | 0.5 | 0.6 | 0.7 |     |
| AE | 0.4 | 0.4 | 0.4 | 0.5 | 0.5 |
| BC |     | 0.5 | 0.7 | 0.6 |     |
| BD | 0.9 | 0.7 | 0.8 | 0.8 | 0.7 |
| BE | 0.3 | 0.4 | 0.5 | 0.4 | 0.5 |
| CD |     |     | 0.5 | 0.7 | 0.6 |
| CE | 0.4 | 0.5 | 0.5 | 0.4 | 0.4 |
| DE |     |     |     |     |     |

TABLE 2

| AB   | AC   | AD   | AE   | BC   | BD   | BE   | CD   | CE   | DE |
|------|------|------|------|------|------|------|------|------|----|
| 0.60 | 0.78 | 0.60 | 0.44 | 0.60 | 0.78 | 0.42 | 0.60 | 0.44 |    |

It should be understood that the approaches for generating pairwise relationship data and recording the data in a database described above have been presented by way of example only, and not limitation. Other approaches will be apparent to persons skilled in the relevant art given the discussion herein.

Nonlinear Mapping Using Subset Refinements

A nonlinear mapping algorithm that is well suited for large data sets is presented in U.S. patent application Ser. No. 09/303,671, filed May 3, 1999, titled, "Method, System and Computer Program Product for Nonlinear Mapping of Multidimensional Data", and U.S. patent application Ser.

No. 09/073,845, filed May 7, 1998, titled, "Method, System and Computer Program Product for Representing Proximity Data in a Multidimensional Space". This approach is to use iterative refinement of coordinates based on partial or stochastic errors.

The method uses a self-organizing principle to iteratively refine an initial (random or partially ordered) configuration of objects by analyzing only a subset of objects and their associated relationships at a time. The relationship data may be complete or incomplete (i.e. some relationships between objects may not be known), exact or inexact (i.e. some or all relationships may be given in terms of allowed ranges or limits), symmetric or asymmetric (i.e. the relationship of object A to object B may not be the same as the relationship of B to A) and may contain systematic or stochastic errors.

The relationships between objects may be derived directly from observation, measurement, a priori knowledge, or intuition, or may be determined directly or indirectly using any suitable technique for deriving such relationships.

The invention determines the coordinates of a plurality of objects on the m-dimensional nonlinear map by:

(1) placing the objects on the m-dimensional nonlinear map;
(2) selecting a subset of the objects, wherein the selected subset of objects includes associated relationships between objects in the selected subset;
(3) revising the coordinate(s) of one or more objects in the selected subset of objects on the m-dimensional nonlinear map based on the relationship(s) between some of these objects and their corresponding distance(s) on the nonlinear map;
(4) repeating steps (2) and (3) for additional subsets of objects from the plurality of objects.

In one embodiment, subsets of objects can be selected randomly, semi-randomly, systematically, partially systematically, etc. As subsets of objects are analyzed and their distances on the nonlinear map are revised, the set of objects tends to self-organize.

In a preferred embodiment, the invention iteratively analyzes a pair of objects at a time, that is, step (2) is carried out by selecting a pair of objects having an associated pairwise relationship. Pairs of objects can be selected randomly, semi-randomly, systematically, partially systematically, etc. This embodiment is described herein for illustrative purposes only and is not limiting. Various other embodiments are described herein.

In a preferred embodiment, the method starts with an initial configuration of points generated at random or by some other procedure such as principal component analysis. This initial configuration is then continuously refined by repeatedly selecting two objects, i, j, at random, and modifying their coordinates on the nonlinear map according to Eq. 5:

$$y_i(t+1) = f(t, y_i(t), y_j(t), r_{ij}) \quad (5)$$

where t is the current iteration, $y_i(t)$ and $y_j(t)$ are the current coordinates of the i-th and j-th objects on the nonlinear map, $y_i(t+1)$ are the new coordinates of the i-th object on the nonlinear map, and $r_{ij}$ is the relationship between the i-th and j-th objects. $f(.)$ in Eq. 5 above can assume any functional form. Ideally, this function should try to minimize the difference between the distance on the nonlinear map and the actual relationship between the i-th and j-th objects. For example, $f(.)$ may be given by Eq. 6:

$$y_i(t+1) = 0.5\lambda(t)\frac{r_{ij} - d_{ij}(t)}{d_{ij}(t)}(y_i(t) - y_j(t)) \quad (6)$$

where t is the iteration number, $d_{ij}=\|y_i(t)-y_j(t)\|$, and $\lambda(t)$ is an adjustable parameter, referred to hereafter as the "learning rate". This process is repeated for a fixed number of cycles, or until some global error criterion is minimized within some prescribed tolerance. A large number of iterations are typically required to achieve statistical accuracy.

The method described above is generally reminiscent of the error back-propagation procedure for training artificial neural networks described in Werbos, Beyond Regression: New Tools for Prediction and Analysis in the Behavioral Sciences, PhD Thesis, Harvard University, Cambridge, Mass. (1974), and Rumelhart and McClelland, Eds., Parallel Distributed Processing: Explorations in the Microstructure of Cognition, Vol. 1, MIT Press, Cambridge, Mass. (1986), both of which are incorporated herein by reference in their entireties.

The learning rate $\lambda(t)$ in EQ. 6 plays a key role in ensuring convergence. If $\lambda$ is too small, the coordinate updates are small, and convergence is slow. If, on the other hand, $\lambda$ is too large, the rate of learning may be accelerated, but the nonlinear map may become unstable (i.e. oscillatory). Typically, $\lambda$ ranges in the interval [0, 1] and may be fixed, or it may decrease monotonically during the refinement process. Moreover, $\lambda$ may also be a function of i, j, $r_{ij}$, and/or $d_{ij}$, and can be used to apply different weights to certain objects, relationships, distances and/or relationship or distance pairs.

One of the main advantages of this approach is that it makes partial refinements possible. It is often sufficient that the pairwise similarities are represented only approximately to reveal the general structure and topology of the data. Unlike traditional MDS, this approach allows very fine control of the refinement process. Moreover, as the nonlinear map self-organizes, the pairwise refinements become cooperative, which partially alleviates the quadratic nature of the problem.

The embedding procedure described above does not guarantee convergence to the global minimum (i.e., the most faithful embedding in a least-squares sense). If so desired, the refinement process may be repeated a number of times from different starting configurations and/or random number seeds.

The general algorithm described above can also be applied when the pairwise similarity matrix is incomplete, i.e. when some of the pairwise relationships are unknown, uncertain or corrupt, or both of the above. It may also be applied when the pairwise relationships are asymmetric, and when some of the pairwise relationships have multiple measurements. Various other embodiments are described herein.

Encoding

This present invention uses the iterative nonlinear mapping algorithm described above to multidimensionally scale a small random sample of the population of objects, and then "learns" the underlying nonlinear transform using an artificial neural network or some other suitable supervised machine learning technique. In the simple case of dimension reduction, the neural network takes as input the n input features associated with the object(s) of interest, and produces as output the coordinates of the objects on the m-dimensional nonlinear map. The present invention is aimed at cases where the object representation that is used to determine the relationships between objects is not in the form of an n-dimensional real vector, and therefore cannot be used directly as input to the neural network. Consider for example, the relationship (similarity) between two conformations of an organic molecule. A common measure of similarity is the root-mean-squared deviation of the atomic coordinates after a least-squares superposition of the two conformations. The object representation (atomic coordinates) can not be used directly as input to the neural network, and needs to be recast in the form of an n-dimensional real vector. Another example represents relationships (similarities) between long binary encoded objects, i.e. objects described by a long sequence of binary numbers, such as images, for example. Because of their high dimensionality, such long binary representations do not lend themselves as input to a neural network.

Thus, the present invention attempts to convert each object into a fixed-length (n-dimensional) real vector that can be used as input to the supervised machine learning technique. This can be carried out in a variety of ways. In a preferred embodiment, a set of n reference objects is identified, and every object in the plurality of objects is compared to these n reference objects. Thus, every object is associated with n relationships to a fixed set of reference objects. These n relationships, along with the m output coordinates on the nonlinear map, are then used as input to a supervised machine learning technique, which extracts the mapping function after a process of training. The process is illustrated in FIG. 1.

In another embodiment, a set of n object attributes are determined for each object. Ideally, these attributes should be related to the method used to determine the relationships between objects. For example, in the case of long binary representations, the n input features may represent the n principal components of the binary feature matrix that account for most of the variance in the data set. In general, the more relevant the n input features are to the problem of interest, the better the supervised machine learning technique is able to approximate the mapping function.

Nonlinear Mapping Networks—Algorithm I

In an exemplary embodiment, a simple 3-layer network with n input and m output units can be employed to determine the mapping function. The network is trained to reproduce the input/output features of the objects produced by the iterative nonlinear mapping algorithm, and thus encodes the mapping in its synaptic parameters in a compact, analytical manner. Once trained, the neural network can be used in a feed-forward fashion to project the remaining members of the input set, as well as new, unseen objects.

In an embodiment, the projection can be carried out using a multiplicity of neural networks, each of which is trained independently and specializes in the prediction of a subset of the m output features. For example, the system may involve m independent neural networks each of which specializes in the prediction of a single output feature.

In an embodiment, a feature selection algorithm may also be employed in order to reduce the number of inputs supplied to the neural network(s). A feature selection algorithm identifies a subset of the original n input features that are sufficient for training. Many feature selection algorithms can be employed, ranging from greedy approaches, to Monte-Carlo search, simulated annealing and genetic algorithms. It will be apparent to a person skilled in the relevant art how to implement a feature selection algorithm in the context of the present invention.

Figure 2:
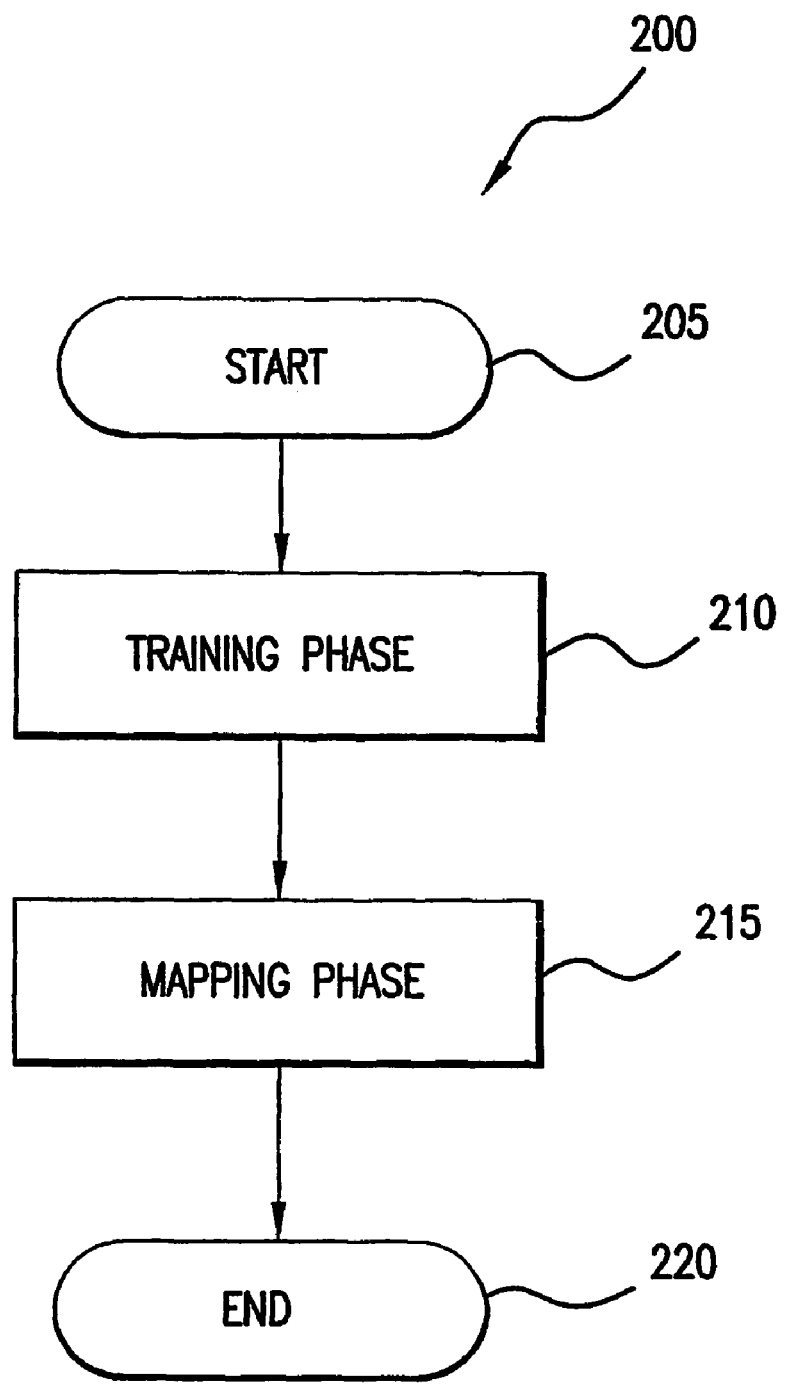
FIG. 2 is a flowchart illustrating exemplary phases of the method of the invention.

The method of the invention is illustrated generally in FIG. 2. The method begins at step 205. In step 210, the training of a neural network takes place, where the training is based on the results (i.e., the inputs and outputs) of the iterative algorithm. In step 215, points in $R^n$ are projected into $R^m$ by a feed-forward pass through the trained neural network. The process concludes with step 220.

Local Nonlinear Mapping Networks—Algorithm II

The embodiment of the invention described in this section represents a variation of the above algorithm. This approach is based on local learning. Instead of using a single "global" network to perform the nonlinear mapping across the entire input data space $R^n$, this embodiment partitions the space into a set of Voronoi polyhedra, and uses a separate "local" network to project the patterns in each partition. Given a set of reference points $P=\{p_1, P_2, \ldots\}$ in $R^n$, a Voronoi polyhedron (or Voronoi cell), v(p), is a convex polytope associated with each reference point p which contains all the points in $R^n$ that are closer to p than any other point in P:

$$v(p)=\{x \in R^n | d(x,p) \leq d(x,q) \forall p,q \in P, p \neq q\} \quad (11)$$

where d( ) is a distance function. In an embodiment of the invention, d( ) is the Euclidean distance function. Voronoi cells partition the input data space $R^n$ into local regions "centered" at the reference points P, also referred to as centroids. Hereafter, the local networks associated with each Voronoi cell are said to be centered at the points P, and the distance of a point in $R^n$ from a local network will refer to the distance of that point from the network's center.

The training phase involves the following general steps: a training set is extracted from the set of input patterns and mapped using the iterative nonlinear mapping algorithm described above. A set of reference points in the input space $R^n$ is then selected, and the objects comprising the training set are partitioned into disjoint sets containing the patterns falling within the respective Voronoi cells. Patterns that lie on the sides and vertices of the Voronoi cells (i.e. are equidistant to two or more points in P), are arbitrarily assigned to one of the cells. A local network is then assigned to each cell, and is trained to reproduce the input/output mapping of the input patterns in that cell. While the direct nonlinear map is obtained globally, the networks are trained locally using only the input patterns within their respective Voronoi partitions. Again, simple 3-layer neural network with n input and m output units can be employed, where n and m are the dimensionalities of the input and output spaces, respectively.

Figure 3:
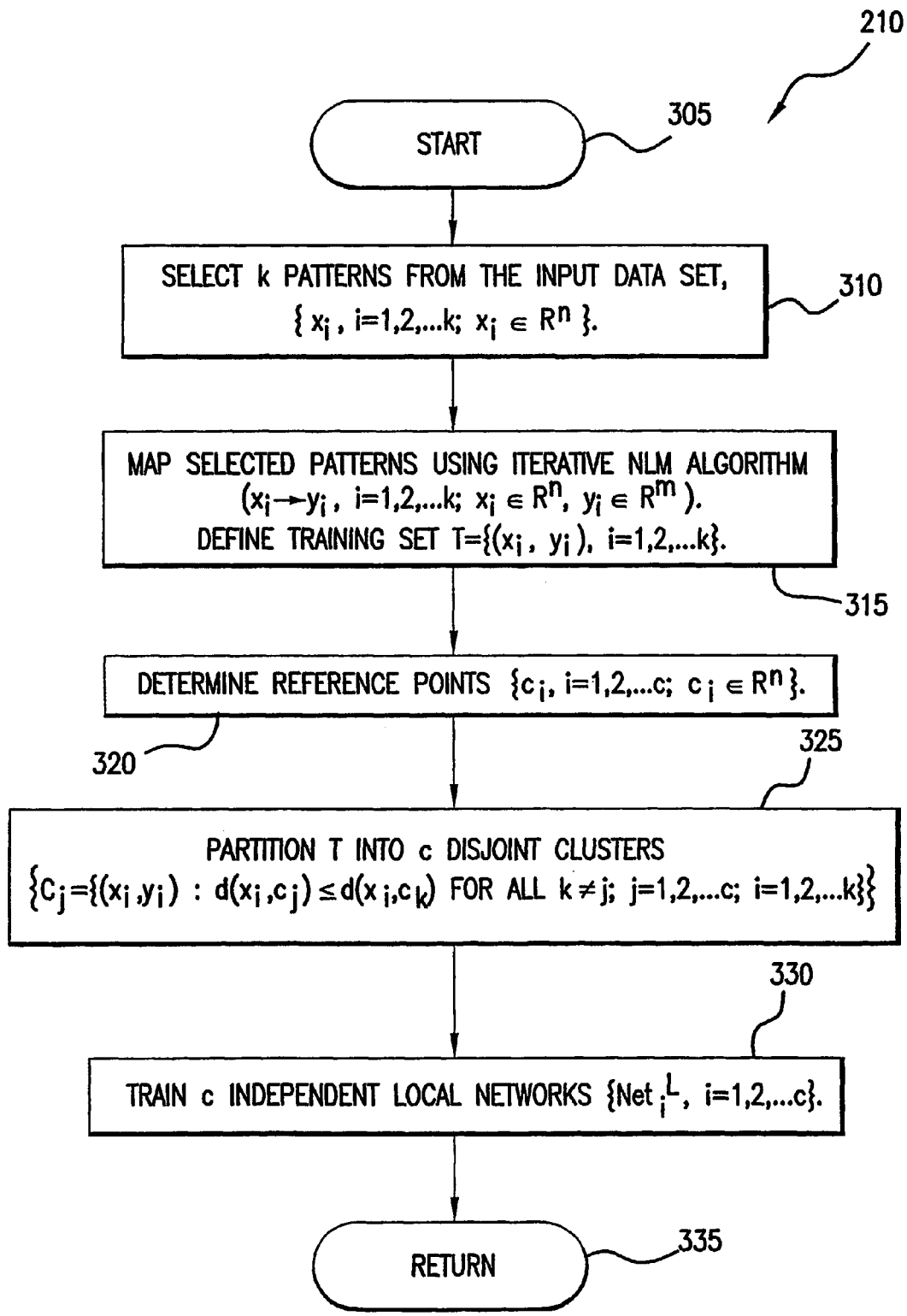
FIG. 3 is a flowchart illustrating an exemplary training phase of the invention, according to an embodiment of the invention.

The training phase of the method of the invention therefore involves the following steps as illustrated in FIG. 3. The training phase begins at step 305. In step 310, a random set of points $\{x_i, i=1, 2 \ldots, k; x_i \in R^n\}$ is extracted from the set of input patterns. In step 315, the points $x_i$ are mapped from $R^n$ to $R^m$ using the iterative nonlinear mapping algorithm described above ($x_i \rightarrow y_i$, $i=1, 2, \ldots, k$, $x_i \in R^n$, $y_i \in R^m$). This mapping serves to define a training set T of ordered pairs ($x_i$, $y_i$), $T=\{(x_i, y_i), i=1, 2, \ldots k\}$.

In step 320, a set of reference points $P=\{c_i, i=1, 2, \ldots c; c_i \in R^n\}$ is determined. In an embodiment of the invention, the reference points $c_i$ are determined using a clustering algorithm described in greater detail below. In step 325, the training set T is partitioned into c disjoint clusters based on the distance of each pattern $x_i$ from each reference pattern. The set of disjoint clusters is denoted $\{C_j=\{(x_i, y_i): d(x_i, c_j) \leq d(x_i, c_k)\}$ for all $k \neq j$; $j=1, 2, \ldots, c$; $i=1, 2, \ldots, k\}\}$.

In step 330, c independent local networks {$Net_i^L$, i=1, 2, ..., c} are trained with the respective training subsets $C_i$ derived in step 325. The training phase concludes with step 335.

Clearly, an important choice to be made concerns the partitioning. In general, the reference points $c_i$ (determined in step 320) should be well distributed and should produce balanced partitions that contain a comparable number of training patterns. This is necessary in order to avoid the creation of poorly optimized networks due to an insufficient number of training cases. In one embodiment, described here, the reference points $c_i$ can be determined using a clustering methodology.

Figure 5:
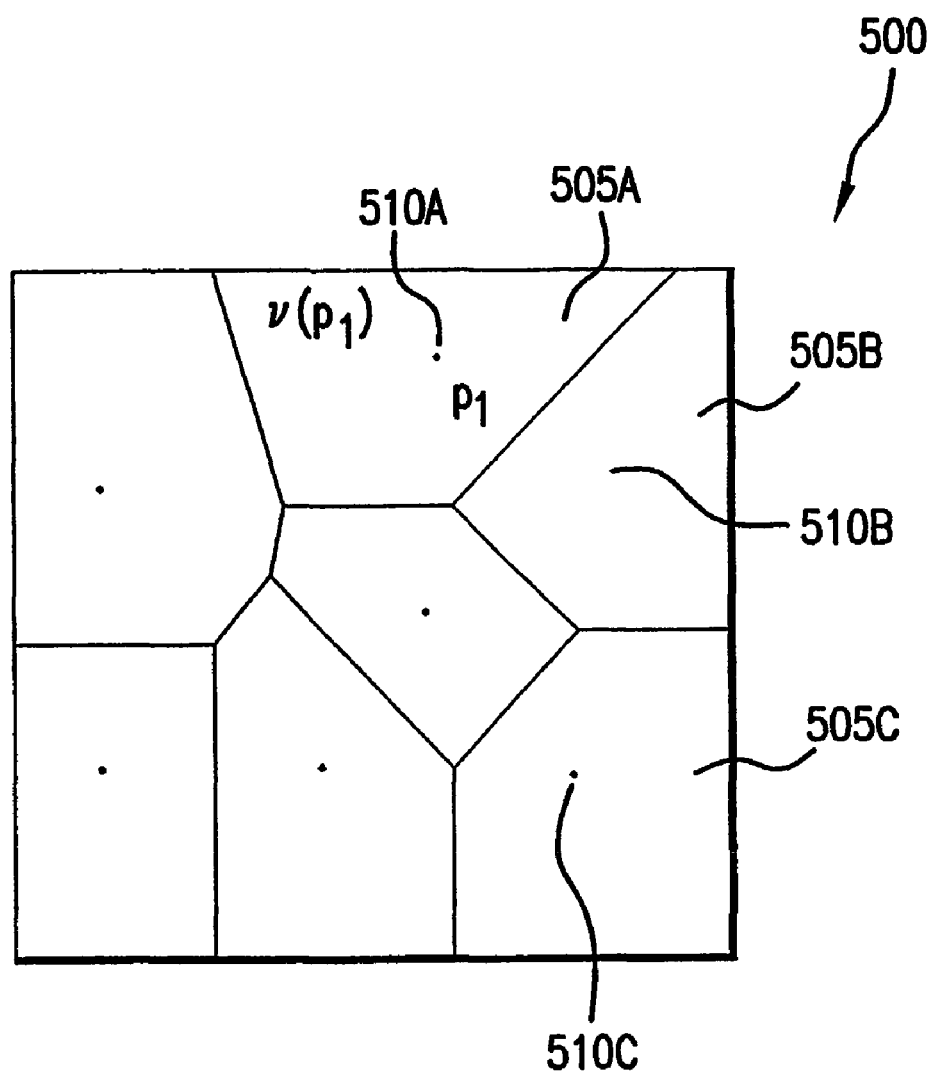
FIG. 5 illustrates the concept of Voronoi Cells, as used in an embodiment of the invention.

Once determined, the reference points $c_i$ are used to partition the input data set into a set of Voronoi cells. Such cells are illustrated in FIG. 5. A set 500 is shown partitioned into Voronoi cells, such as cells 505A through 505C. The Voronoi cells include refence points 510A through 510C respectively.

Figure 6:
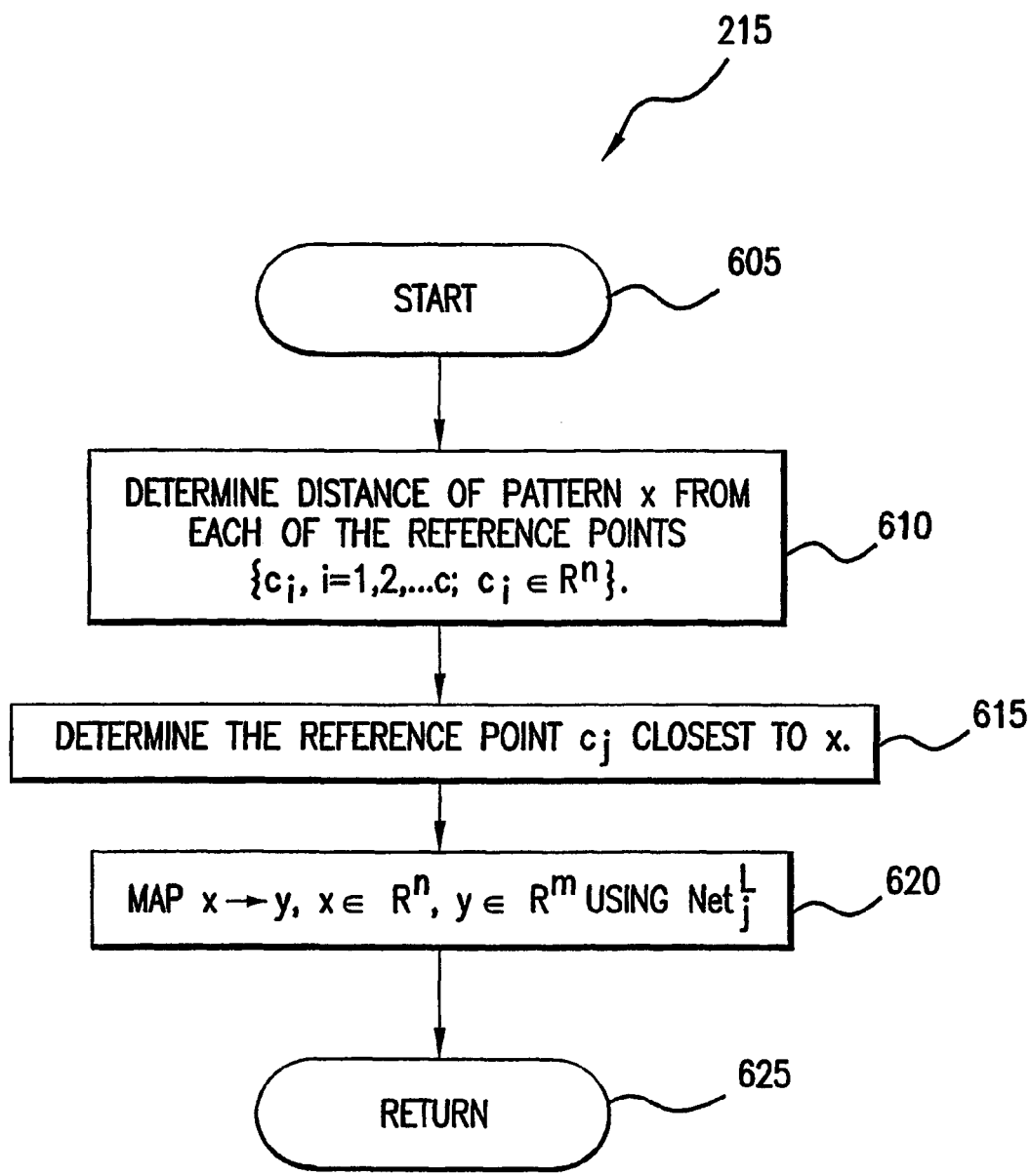
FIG. 6 is a flowchart illustrating the projection of input patterns, according to an embodiment of the invention.

Once all the local networks are trained, additional patterns from the input set of patterns can be mapped into $R^m$ as illustrated in FIG. 6. The process begins with step 605. In step 610, the distance of the input pattern x to each reference point in {$c_i$, i=1, 2, ... c; $c_i \in R^n$} is determined. In step 615, the point $c_j$ that is nearest to the input pattern x is identified. In step 620, the pattern x is mapped to a point y in $R^m$, x→y, x∈$R^n$, y∈$R^m$ using the local neural network $Net_j^L$ associated with the reference point $c_j$ identified in step 615. The process concludes with step 625.

Figure 7:
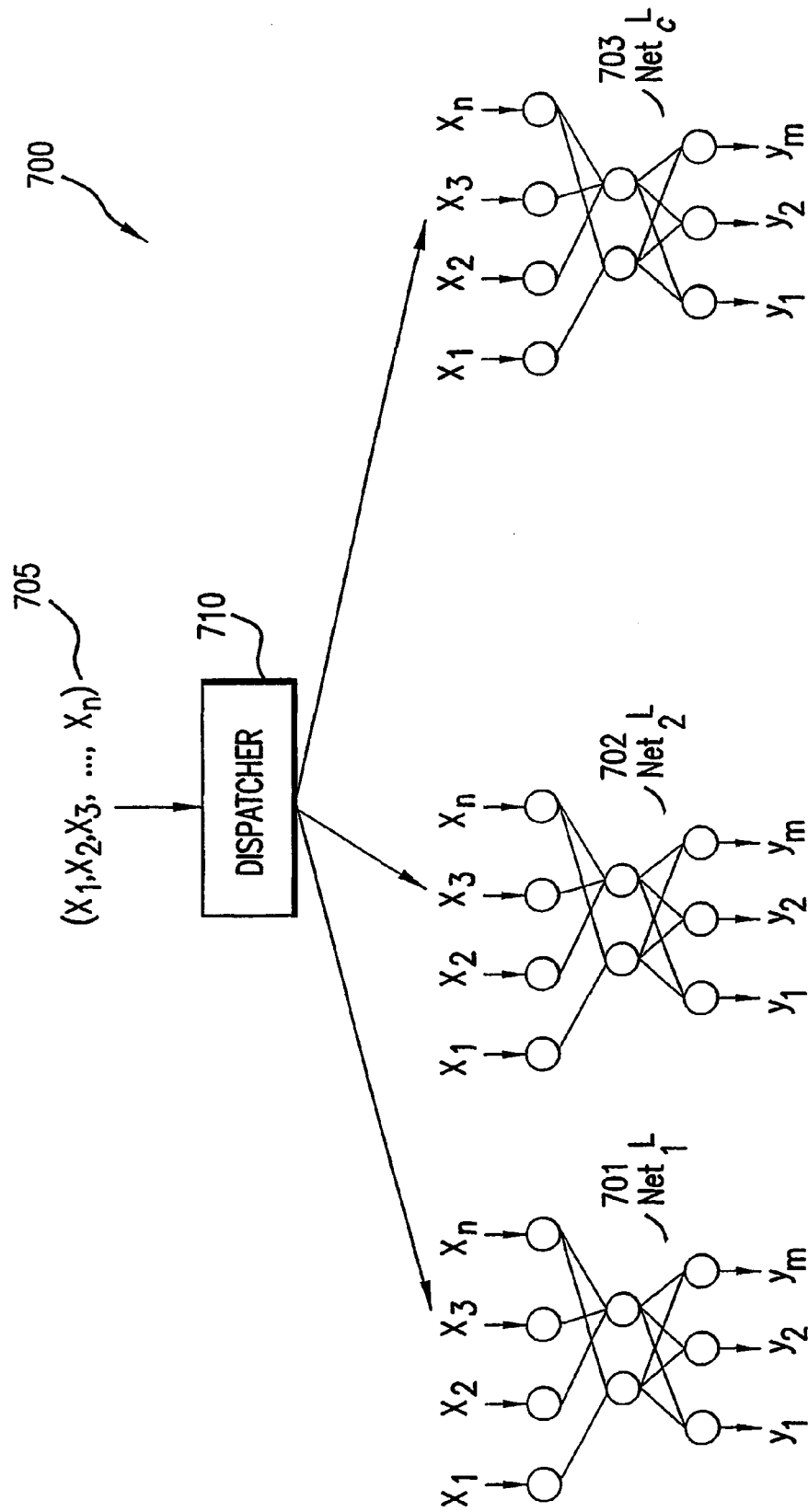
FIG. 7 illustrates the operation of local neural networks, according to an embodiment of the invention.

Note that new patterns in $R^n$ that not in the original input set can also be projected into $R^m$ in the manner shown in FIG. 6. Once the system is trained, new paterns in $R^n$ are mapped by identifying the nearest local network and using that network in a feed-forward manner to perform the projection. An embodiment of a system that does this is illustrated in FIG. 7. The input for the system is a pattern 705 in $R^n$. This point is defined by its n attributes, $(x_1, x_2, ... x_n)$. The system includes a dispatcher module 710, which compares the distance of the input point to the network centers (i.e., the reference points), and forwards the input point to one of the available local neural networks 701, 702, or 703. Specifically, the input pattern is sent to the local neural network associated with the reference point nearest to the input pattern. The chosen network then performs the final projection, resulting in an output point in $R^m$.

Local Nonlinear Mapping Networks—Algorithm III

The ability of a single network to reproduce the general structure of the nonlinear map suggests an alternative embodiment to overcome some of the complexities of clustering in higher dimensions. Conceptually, the alternative embodiment differs from Algorithm II in the way it partitions the data space. In contrast to the previous method, this process partitions the output space, and clusters the training patterns based on their proximity on the m-dimensional nonlinear map rather than their proximity in the n-dimensional input space. For the training set, the assignment to a partition is straightforward. The images of the points in the training set on the nonlinear map are derived directly from the iterative nonlinear mapping algorithm described above. For new points that are not part of the training set, the assignment is based on approximate positions derived from a global neural network trained with the entire training set, like the one of Algorithm II described above. A. The general flow of the algorithm is similar to the one described in the preceding section.

Figure 8:
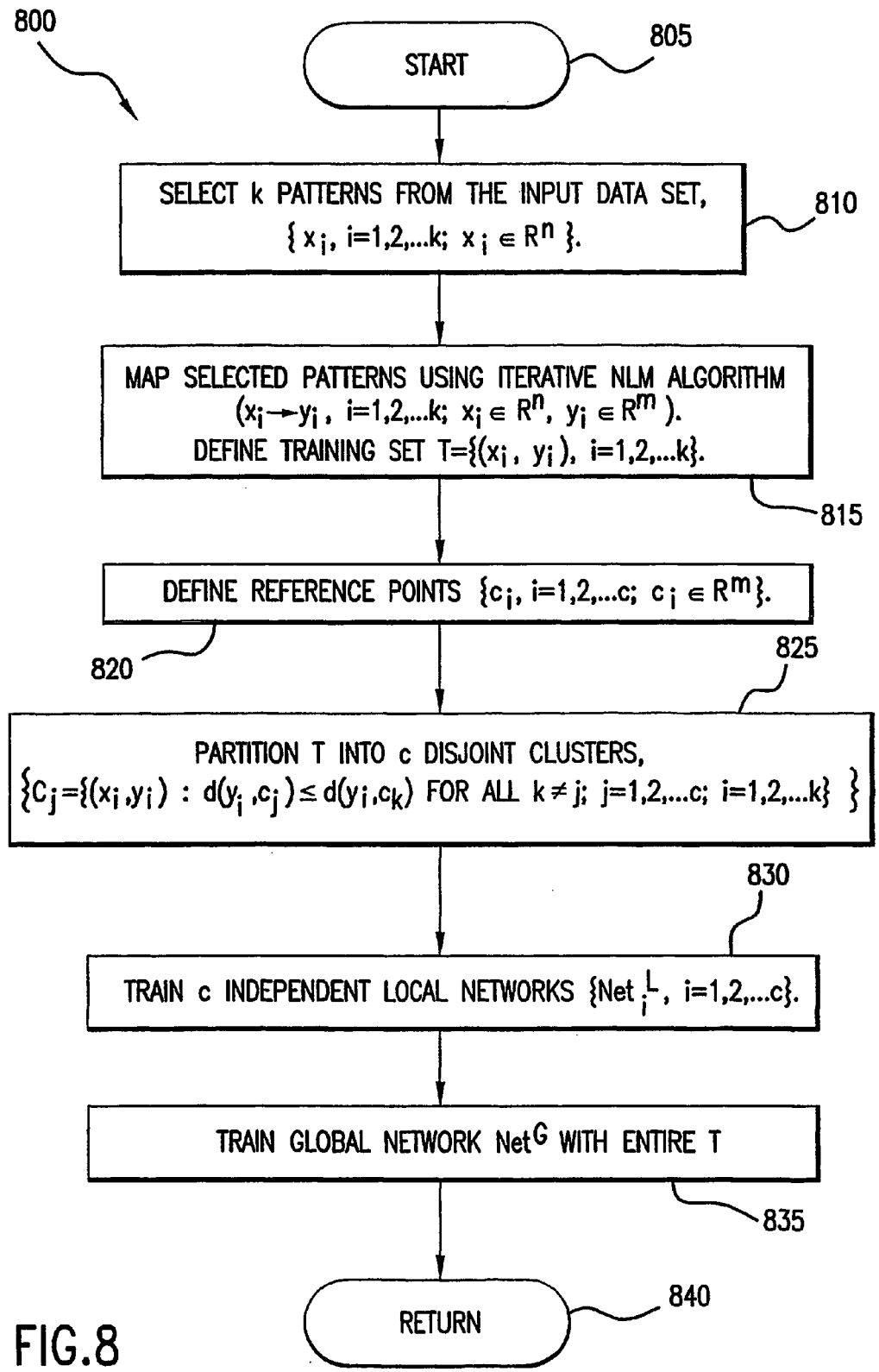
FIG. 8 is a flowchart illustrating an exemplary training phase of the invention, according to an alternative embodiment.

The training phase for this embodiment is illustrated in FIG. 8. The method begins at step 805. In step 810, a random set of patterns {$x_i$, i=1, 2, ..., k; $x_i \in R^n$} is extracted from the input data set. In step 815, the patterns $x_i$ are mapped from $R^n$ to $R^m$ using the iterative nonlinear mapping algorithm described in section I B ($x_i \to y_i$, i=1, 2, ..., k, $x_i \in R^n$, $y_i \in R^m$). This mapping serves to define a training set T of ordered pairs $(x_i, y_i)$, T={$(x_i, y_i)$, i=1, 2, ..., k}.

Figure 4:
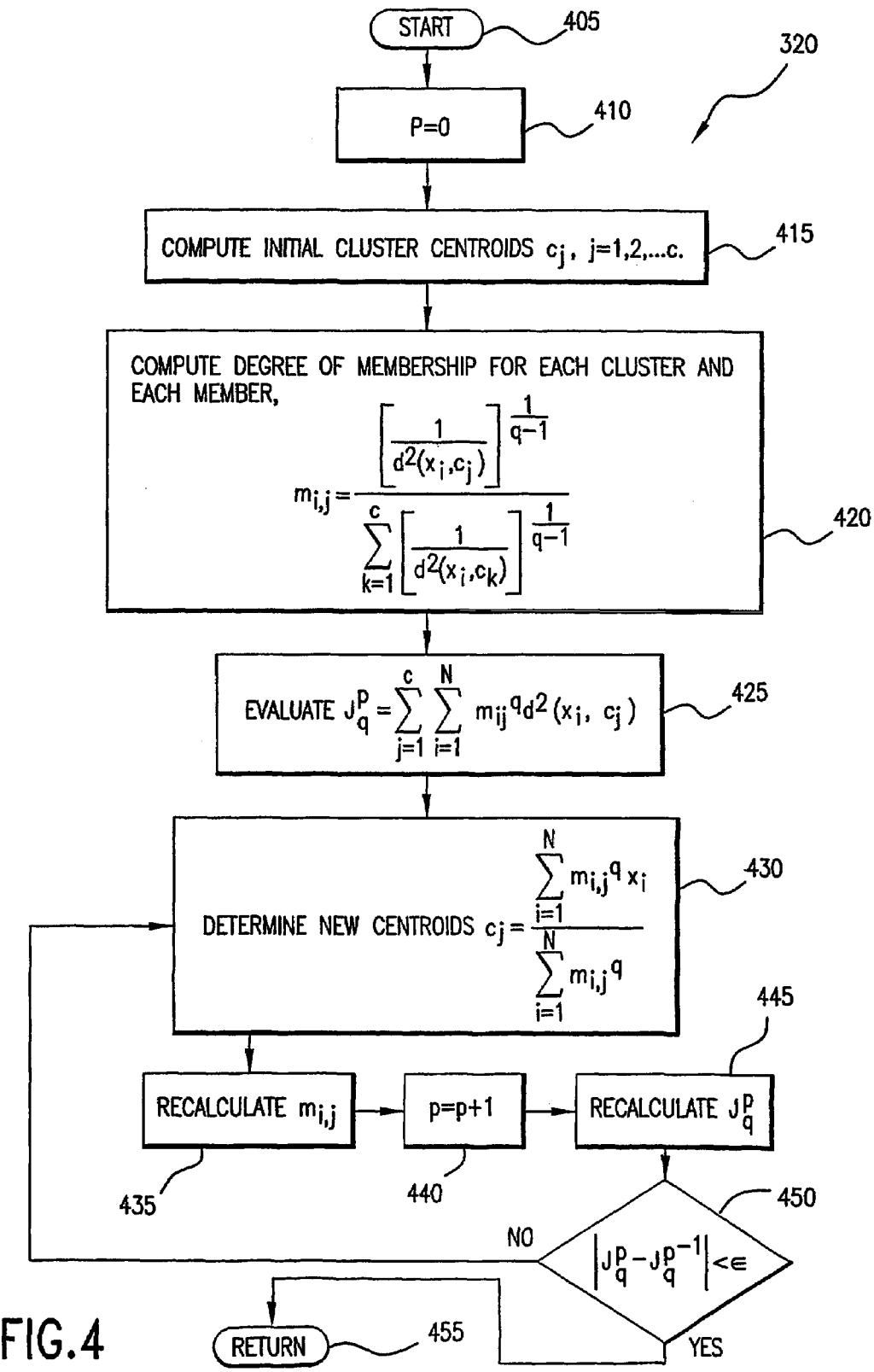
FIG. 4 is a flowchart illustrating the use of a fuzzy clustering methodology in the selection of reference patterns, according to an embodiment of the invention.

In step 820, the points {$y_i$, i=1, 2, ..., k, $y_i \in R^m$} are clustered into c clusters associated with c points in $R^m$, {$c_i$, i=1, 2, ... c; $c_i \in R^m$}. In the illustrated embodiment, fuzzy clusters are formed in this step using the FCM algorithm of FIG. 4. In step 825, the training set T is partitioned into c disjoint clusters $C_j$ based on the distance of the images $y_i$ from the cluster prototypes, {$C_j$={$(x_i, y_i)$: $d(y_i, c_j) \leq d(y_i, c_k)$ for all k≠j; j=1, 2, ..., c; i=1, 2, ..., k}}. In step 830, c independent local neural networks {$Net_i^L$, i=1, 2, ..., c} are trained with the respective clusters $C_j$ derived in step 825. In step 835, a global network $Net^G$ is trained with the entire training set T. The process concludes with step 840.

Figure 9:
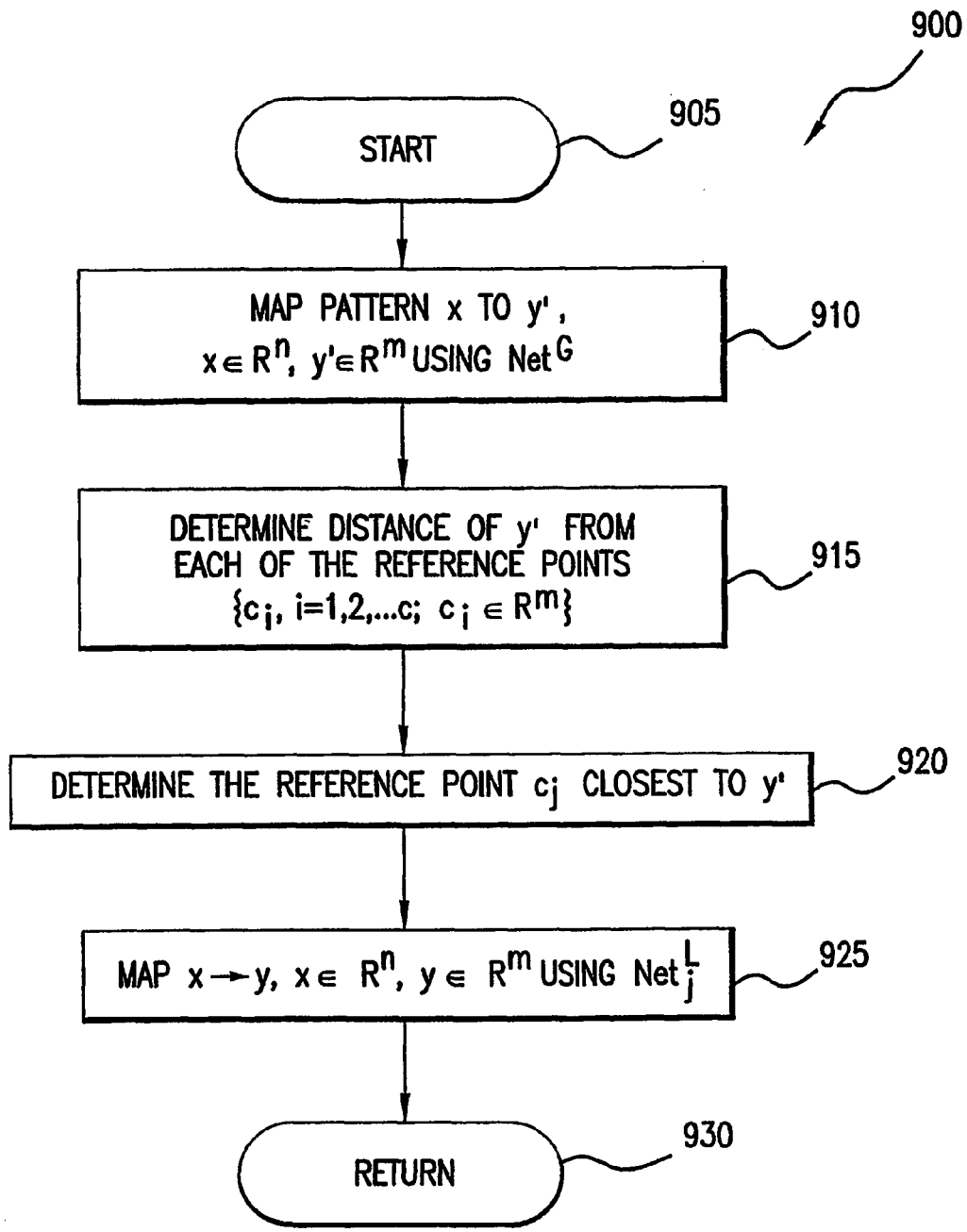
FIG. 9 is a flowchart illustrating the projection of input patterns, according to an alternative embodiment of the invention.

Once all the networks are trained, remaining input patterns from the input data set and any new patterns in $R^n$ are projected using a tandem approach. An embodiment of this is illustrated in FIG. 9. The projection process begins at step 905. In step 910, each input pattern x to be projected into $R^m$ is mapped, x→y', x∈$R^n$, y'∈$R^m$, using the global network $Net^G$ derived in step 835.

Figure 10:
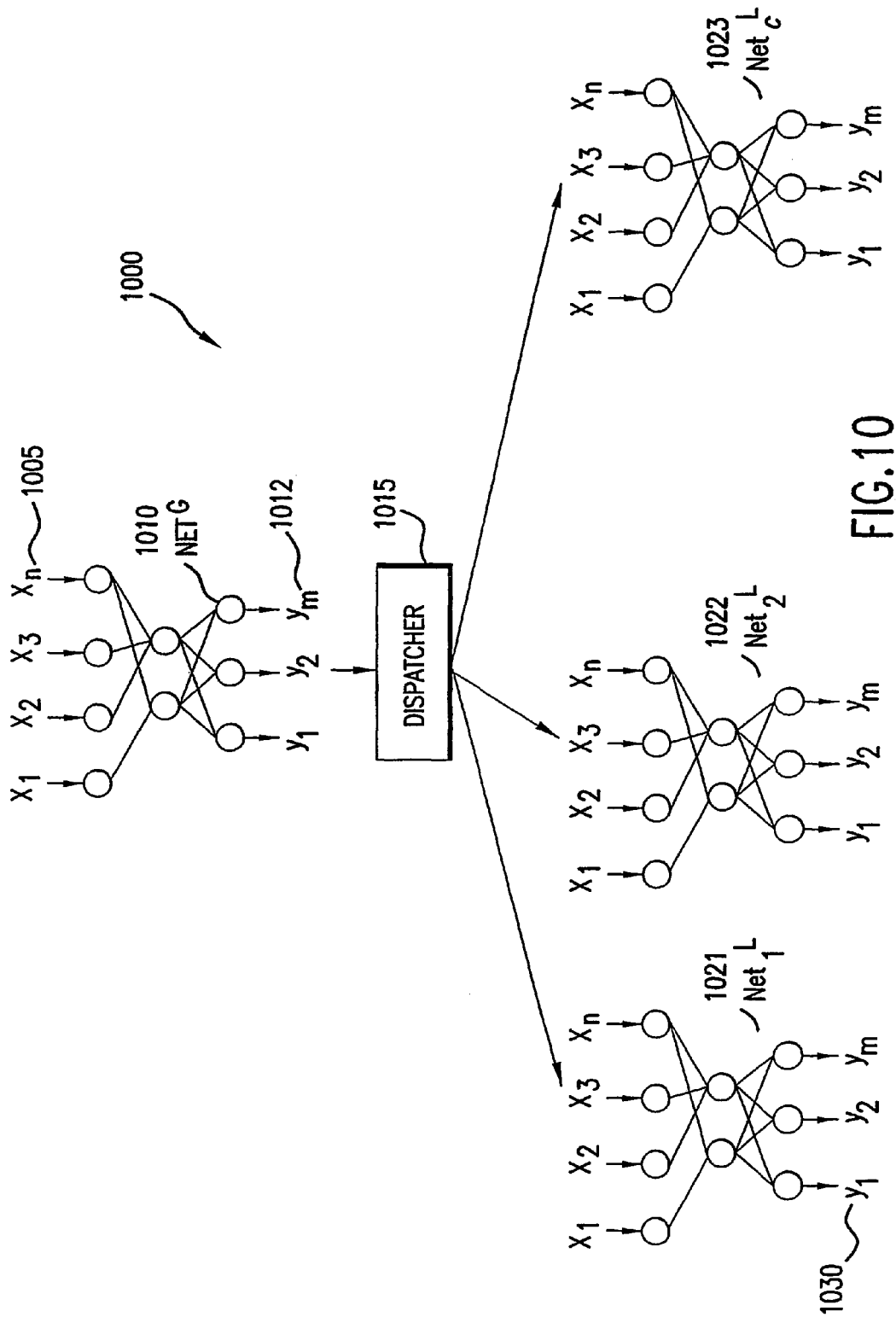
FIG. 10 illustrates the operation of global and local neural networks, according to an alternative embodiment of the invention.

In step 915, the distance from y' to each reference point $c_i$ in {$c_i$, i=1, 2, ... c; $c_i \in R^m$} is determined. In step 920, the point $c_j$ closest to y' is determined. In step 925, x is mapped into $R^m$, x→y, using the local neural network associated with $c_j$, $Net_j^L$. The process ends with step 930. A system for performing the overall mapping x→y is shown in FIG. 10. First, an input pattern 1005 ∈$R^n$ is projected by the global network 1010, $Net^g$, to obtain point 1012 (y') ∈$R^m$. Point y' can be viewed as having approximate coordinates on the nonlinear map. These coordinates are used to identify the nearest local network 1021 ($Net_j^L$) from among the possible local neural networks 1021 through 1023, based on the proximity of y' to each $c_i$. Input point 1005 is projected once again, this time by the nearest local network 1021 to produce the final image 1030 on the display map.

Environment

Figure 11:
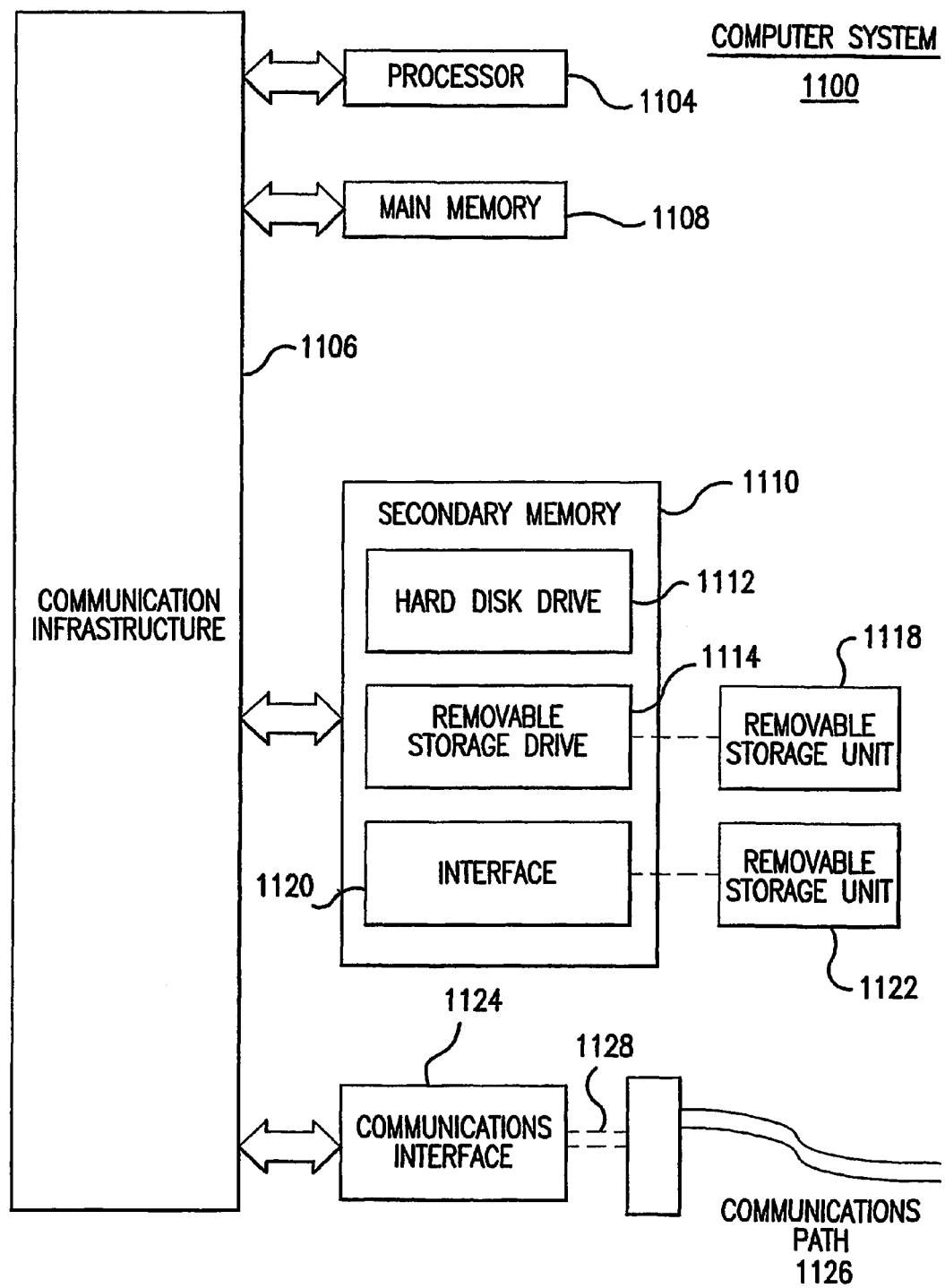
FIG. 11 illustrates an exemplary computing environment within which the invention can operate.

FIG. 11 shows an example computer system 1100 that supports implementation of the present invention. The present invention may be implemented using hardware, software, firmware, or a combination thereof. It may be implemented in a computer system or other processing system. The computer system 1100 includes one or more processors, such as processor 1104. The processor 1104 is connected to a communication infrastructure 1106 (e.g., a bus or network). Various software embodiments can be described in terms of this exemplary computer system. After reading this description, it will become apparent to a person skilled in the relevant art how to implement the invention using other computer systems and/or computer architectures.

Computer system 1100 also includes a main memory 1108, preferably random access memory (RAM), and may also include a secondary memory 1110. The secondary memory 1110 may include, for example, a hard disk drive 1012 and/or a removable storage drive 1114, representing a floppy disk drive, a magnetic tape drive, an optical disk drive, etc. The removable storage drive 1114 reads from and/or writes to a removable storage unit 1118 in a well known manner. Removable storage unit 1118 represents a floppy disk, magnetic tape, optical disk, etc. As will be appreciated, the removable storage unit 1118 includes a computer usable storage medium having stored therein computer software and/or data. In an embodiment of the invention, removable storage unit 1118 can contain input data to be projected.

Secondary memory 1110 can also include other similar means for allowing computer programs or input data to be loaded into computer system 1100. Such means may include, for example, a removable storage unit 1122 and an interface 1120. Examples of such may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a PCMCIA slot and card, etc. Software and data transferred via communications interface 1124 are in the form of signals 1128 which may be electronic, electromagnetic, optical or other signals capable of being received by communications interface 1124. These signals 1128 are provided to communications interface 1124 via a communications path (i.e., channel) 1126. This channel 1126 carries signals 1128 and may be implemented using wire or cable, fiber optics, a phone line, a cellular phone link, an RF link and other communications channels. In an embodiment of the invention, signals 1128 can include input data to be projected.

Computer programs (also called computer control logic) are stored in main memory 1108 and/or secondary memory 1110. Computer programs may also be received via communications interface 1124. Such computer programs, when executed, enable the computer system 1100 to perform the features of the present invention as discussed herein. In particular, the computer programs, when executed, enable the processor 1104 to perform the features of the present invention. Accordingly, such computer programs represent controllers of the computer system 1100.

Computer Network Environment

Figure 12:
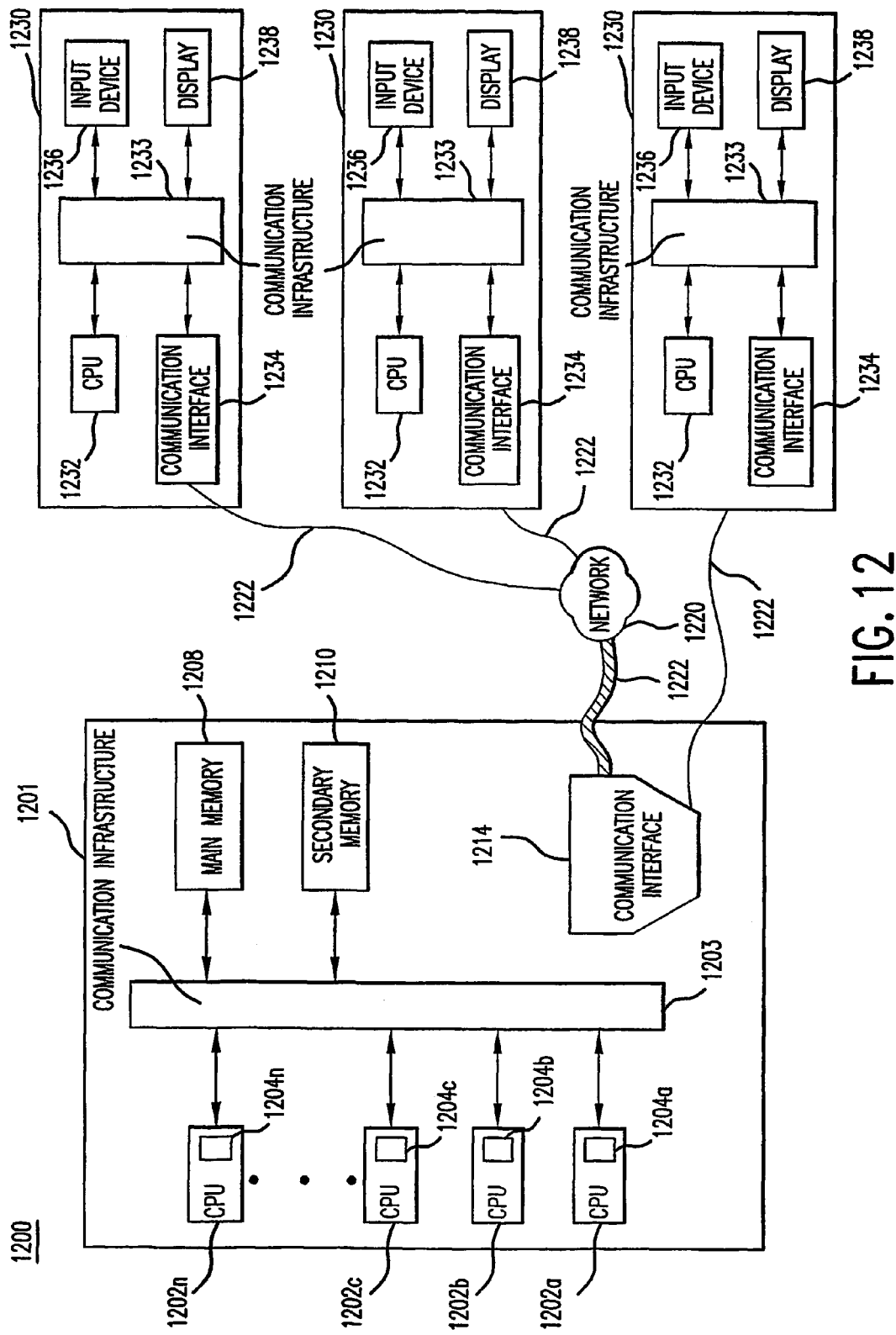
FIG. 12 illustrates an example computer network environment of the present invention.

FIG. 12 is a block diagram illustrating an exemplary computer network or network system 1200. Network system 1200 is used to receive pairwise relationship data in accordance with an embodiment of the present invention.

Network server 1201 is shown having multiple central processor units (CPU) 1202. In other embodiments, network server 1201 can have only one CPU 1202. Computers 1230 are shown having only a single CPU 1232, but they can have more than one CPU 1232. Portions of the present invention are comprised of computer-readable and computer executable instructions which reside in computer-usable media of network server 1201 and/or computers 1230.

Network server 1201 has multiple central processor units (CPU) 1202. CPUs 1202 are electrically connected to a communication infrastructure 1203. Also connected to communications infrastructure 1203 are a main memory unit 1208, a secondary memory unit 1210, a graphics subsystem 1212, and a communications interface unit 1214. Each CPU 1202 may have a cache memory unit 1204. Network server 1201 is typically optimized for managing network communications, storing files, and/or processing database queries.

Computers 1230 are depicted as having only a single CPU 1202. Computers 1230 may have more than one CPU, however. CPU 1202 is electrically connected to a communication infrastructure 1233. Also connected to communications infrastructure 1233 are a communications interface unit 1234, an input device 1236, and a display 1238.

The user inputs commands to computer 1230 using input device 1236. The commands are then either processed by CPU 1232 or transferred to another CPU for processing via communications interface 1234, communications link 1222, and network 1220.

As described herein, in an embodiment, a computer program product running on network server 1201 is used to select pairs of objects (patterns) from a database. These selected objects are then sent from network server 1201 via network 1220 or communications link 1222 to one or more subjects at computers 1230. At computers 1230, the selected pairs of objects are presented to the subjects on displays 1238 as objects for pairwise comparison. The subjects evaluate the similarity of the pairs of objects presented to them and enter data using input devices 1236. The data input by the subjects is then send via network 1220 or communications link 1222 to network server 1201. In an embodiment, the data received from the subjects is stored in a database in network server 1201 for subsequent retrieval and use in accordance with the invention.

CONCLUSION

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A method of mapping a set of input patterns to an m-dimensional space, wherein each pattern represents a compound selected from a database of compounds, the method comprising the steps of:
   (a) selecting k patterns from said set of input patterns to form a subset of patterns $\{p_i, i=1, \ldots, k\}$;
   (b) determining at least some pairwise relationships between at least some of the patterns in said subset of patterns $\{p_i\}$
   (c) mapping the patterns $\{p_i\}$ into a set of images in an m-dimensional space $\{p_i \rightarrow y_i, i=1, 2, \ldots k, y_i \in R^m\}$ so that at least some of the pairwise distances between at least some of the images $\{y_i\}$ are representative of the relationships of the respective patterns $\{p_i\}$;
   (d) determining a set of n attributes for each pattern in said subset of patterns $\{p_i\}$ $\{x_i, i=1, 2, \ldots k, x_i \in R^n\}$;
   (e) forming a training set $T=\{(x_i, y_i), i=1, 2, \ldots k\}$;
   (f) using a supervised machine learning technique to determine a mapping function based on the training set T; and
   (g) using said mapping function determined in step (f) to map additional patterns.

2. The method of claim 1, wherein said mapping function is encoded in at least one neural network.

3. The method of claim 1, wherein step (f) further comprises the steps of:
   (i) determining c n-dimensional reference points, $\{c_i, i=1, 2, \ldots c, c_i \in R^n\}$;

(ii) partitioning T into c disjoint clusters $C_j$ based on a distance function d, $\{C_j=\{(x_i, y_i): d(x_i, c_j) \leq d(x_i, c_k)$ for all $k \neq j$; $j=1, 2, \ldots c$; $i=1, 2, \ldots k\}$; and (iii) using a supervised machine learning technique to determine c independent mapping functions $\{f_i^L, i=1, 2, \ldots c\}$, based on the respective subsets $C_i$ of the training set T.

4. The method of claim 3, wherein each said mapping function is encoded in at least one neural network.

5. The method of claim 3, wherein step (g) further comprises the steps of:
(i) for an additional input pattern p, determining a set of n attributes x, $x \in R^n$;
(ii) determining the distance of x from each said reference point $\{c_i\}$;
(iii) identifying the reference point $c_j$ closest to x; and
(iv) mapping $x \rightarrow y$, $y \in R^m$, using the mapping function $f_j^L$ associated with the reference point $c_j$ identified in step (iii).

6. The method of claim 5, wherein each said mapping function is encoded in at least one neural network.

7. The method of claim 3, wherein step (i) is performed using a clustering algorithm.

8. The method of claim 1, wherein step (f) further comprises the steps of:
(i) determining c m-dimensional reference points, $\{c_i, i=1, 2, \ldots c, c_i \in R^m\}$;
(ii) partitioning T into c disjoint clusters $C_j$ based on a distance function d, $\{C_j=\{(x_i, y_i): d(y_i, c_j) \leq d(y_i, c_k)$ for all $k \neq j$; $j=1, 2, \ldots c$; $i=1, 2, \ldots k\}\}$;
(iii) using a supervised machine learning technique to determine c independent local mapping functions $\{f_i^L, i=1, 2, \ldots c\}$, based on the respective subsets $C_i$ of the training set T; and
(iv) using a supervised machine learning technique to determine a global mapping function $f^G$, based on the entire training set T.

9. The method of claim 8, wherein each said mapping function is encoded in at least one neural network.

10. The method of claim 8, wherein step (g) further comprises the steps of:
(i) for an additional input pattern p, determining a set of n attributes x, $x \in R^n$;
(ii) mapping $x \rightarrow y'$, $y' \in R^m$, using the global mapping function $f^G$;
(iii) determining the distance of y' to each reference point in $\{c_i\}$;
(iv) identifying the reference point $c_j$ closest to y'; and
(v) mapping $x \rightarrow y'$, $y' \in R^m$, using the local mapping function $f_j^L$ associated with the reference point $c_j$ identified in step (iv).

11. The method of claim 10, wherein each said mapping function is encoded in at least one neural network.

12. The method of claim 8, wherein step (i) is performed using a clustering algorithm.

13. The method of claim 1, wherein step (c) further comprises the steps of:
(i) selecting a subset of patterns from $\{p_i\}$;
(ii) revising the positions of the images of said selected subset of patterns in the m-dimensional space based on the relationships between said selected subset of patterns determined in step (b); and
(iii) repeating steps (i) and (ii) for additional subsets of patterns from $\{p_i\}$.

14. The method of claim 1, wherein step (d) comprises the step of:
(i) determining a set of n attributes for each pattern in said subset of patterns $\{p_i\}$, $\{x_i, i=1, 2, \ldots k, x_i \in R^n\}$, wherein said attributes represent the relationships of each pattern in said subset of patterns with respect to n other reference patterns.

15. The method of claim 1, wherein step (b) comprises the step of receiving pairwise relationship data from a subject.

16. The method of claim 15, wherein step (b) comprises the steps of:
(1) randomly selecting two patterns from the plurality of patterns;
(2) presenting the two patterns to at least one subject; and
(3) receiving pairwise relationship data from said subject about the patterns.

17. The method of claim 16, further comprising the step of:
(4) repeating steps (b)(1) through (b)(3) for additional pairs of patterns.

18. The method of claim 17, wherein step (b) further comprises the step of receiving data about the subjects providing the pairwise relationship data.

19. The method of claim 1, wherein step (b) comprises the steps of:
(1) receiving pairwise relationship data via a communications path coupled to a computer; and
(2) storing the received pairwise relationship data in a memory.

20. The method of claim 1, wherein step (b) comprises the steps of:
(1) selecting a pair of patterns for similarity comparison;
(2) transmitting information about the selected pair of patterns to a remote computer system; and
(3) receiving pairwise relationship data about the selected pair of patterns from the remote computer system.

21. The method of claim 20, further comprising the step of:
(4) repeating steps (b)(1) through (b)(3) for additional pairs of compounds.

22. The method of claim 21, wherein step (b)(1) comprises the step of selecting the pair of patterns at random.

23. A computer program product comprising a computer useable medium having computer program logic recorded thereon for enabling a processor to obtain pairwise relationship data about the selected pair of patterns, wherein each pattern represents a compound selected from a database of compounds, said computer program logic comprising:
a selecting procedure that enables the processor to select a plurality of patterns from a database for similarity;
a transmitting procedure that enables a processor to transmit selected patterns to a remote computer for similarity comparison; and
a receiving procedure that enables the processor to receiving similarity data about patterns transmitted to the remote computer.

24. The computer program product of claim 23, further comprising:
a storing procedure that enables the processor to store received similarity data for subsequent retrieval.

25. The computer program product of claim 24, wherein said selecting procedure randomly selecting patterns from the database.

26. A system for mapping a set of input patterns to an m-dimensional space, wherein each pattern represents a compound selected from a database of compounds, the system comprising:

- means for selecting k patterns from said set of input patterns to form a subset of patterns $\{p_i, i=1, \ldots, k\}$;
- means for determining at least some pairwise relationships between at least some of the patterns in said subset of patterns $\{p_i\}$;
- means for mapping the patterns $\{p_i\}$ into a set of images in an m-dimensional space $\{p_i \rightarrow y_i, i=1, 2, \ldots k, y_i \in R^m\}$ so that at least some of the pairwise distances between at least some of the images $\{y_i\}$ are representative of the relationships of the respective patterns $\{p_i\}$;
- means for determining a set of n attributes for each pattern in said subset of patterns $\{p_i\}$, $\{x_i, i=1, 2, \ldots k, x_i \in R^n\}$;
- means for forming a training set $T=\{x_i, y_i, i=1, 2, \ldots k\}$;
- means for using a supervised machine learning technique to determine a mapping function based on the training set T; and
- means for using said mapping function determined in step (f) to map additional patterns.

27. A computer program product comprising a computer useable medium having computer program logic recorded thereon for enabling a processor to obtain map a set of input patters to an m-dimensional space, wherein each pattern represents a compound selected from a database of compounds, said computer program logic comprising:

- a procedure that selects k patterns from said set of input patterns to form a subset of patterns $\{p_i, i=1, \ldots, k\}$;
- a procedure that determines at least some pairwise relationships between at least some of the patterns in said subset of patterns $\{p_i\}$;
- a procedure that maps the patterns $\{p_i\}$ into a set of images in an m-dimensional space $\{p_i \rightarrow y_i, i=1, 2, \ldots k, y_i \in R^m\}$ so that at least some of the pairwise distances between at least some of the images are representative of the relationships of the respective patterns $\{p_i\}$;
- a procedure that determines a set of n attributes for each pattern in said subset of patterns $\{p_i\}$, $\{x_i, i=1, 2, \ldots k, x_i \in R^n\}$;
- a procedure that forms a training set $T=\{x_i, y_i\}, i=1, 2, \ldots k\}$;
- a procedure that uses a supervised machine learning technique to determine a mapping function based on the training set T; and
- a procedure that uses said mapping function determined in step (f) to map additional patterns.

* * * * *